United States Patent
Zhao et al.

(10) Patent No.: US 9,369,513 B2
(45) Date of Patent: Jun. 14, 2016

(54) UTILITY-MAXIMIZATION FRAMEWORK FOR DYNAMIC ADAPTIVE VIDEO STREAMING OVER HYPERTEXT TRANSFER PROTOCOL IN MULTIUSER-MULTIPLE INPUT MULTIPLE OUTPUT LONG-TERM EVOLUTION NETWORKS

(71) Applicant: Futurewei Technologies, Inc., Plano, TX (US)

(72) Inventors: Miao Zhao, Cupertino, CA (US); Bin Jia, Piscataway, NJ (US); Mingquan Wu, Princeton Junction, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 189 days.

(21) Appl. No.: 14/251,290

(22) Filed: Apr. 11, 2014

(65) Prior Publication Data

US 2014/0317241 A1  Oct. 23, 2014

Related U.S. Application Data

(60) Provisional application No. 61/811,623, filed on Apr. 12, 2013.

(51) Int. Cl.
*G06F 15/16* (2006.01)
*H04L 29/06* (2006.01)
(Continued)

(52) U.S. Cl.
CPC ............ *H04L 65/608* (2013.01); *H04B 7/0452* (2013.01); *H04B 7/0456* (2013.01); *H04B 7/0632* (2013.01); *H04B 7/0639* (2013.01);
(Continued)

(58) Field of Classification Search
None
See application file for complete search history.

(56) References Cited

U.S. PATENT DOCUMENTS

| 8,526,452 | B1 * | 9/2013 | Agarwal | H04W 28/10 370/412 |
| 2007/0116024 | A1 * | 5/2007 | Zhang | H04L 12/5693 370/412 |

(Continued)

OTHER PUBLICATIONS

Akhshabi, S., et al., "An Experimental Evaluation of Rate-Adaptation Algorithms in Adaptive Streaming over HTTP," Proceedings of the Second Annual ACM Conference on Multimedia Systems, 2011, 12 pages.

(Continued)

*Primary Examiner* — Wing F Chan
*Assistant Examiner* — Padma Mundur
(74) *Attorney, Agent, or Firm* — Conley Rose, P.C.; Grant Rodolph; Adam J. Stegge

(57) ABSTRACT

A method for scheduling user equipment (UE) devices comprising sorting the plurality of UE devices based on a weight of priority associated with each of the UE devices with respect to a plurality of subbands, and assigning one or more of the UE devices to each of the subbands using the weight of priority associated with the UE devices, wherein the weight of priority is based on one or more network utility functions associated with the UE devices. A computer program product comprising computer executable instructions to receive a media content segment using a dynamic adaptive video streaming over hypertext transfer protocol (HTTP) (DASH) protocol, monitor a playback buffer size of a UE device, monitor a battery energy level of the UE device, and adjust a representation quality level in a segment request based on the target requested video rate, the playback buffer size and the battery energy level.

12 Claims, 13 Drawing Sheets

(51) Int. Cl.
*H04B 7/04* (2006.01)
*H04B 7/06* (2006.01)
*H04L 12/811* (2013.01)

(52) U.S. Cl.
CPC .......... *H04L 47/38* (2013.01); *H04L 65/1059* (2013.01); *H04L 65/4084* (2013.01); *H04L 65/4092* (2013.01); *H04L 65/80* (2013.01)

(56) References Cited

U.S. PATENT DOCUMENTS

| | | | |
|---|---|---|---|
| 2011/0128921 A1* | 6/2011 | Ray | H04L 5/0037 370/329 |
| 2012/0140633 A1* | 6/2012 | Stanwood | H04L 47/2458 370/235 |
| 2014/0068076 A1* | 3/2014 | Dasher | H04L 65/4076 709/226 |

OTHER PUBLICATIONS

Dahlman, E., et al., "3G Evolution: HSPA and LTE for Mobile Broadband," Academic Press, Book Aid International, Sabre Foundation, 2007, 485 pages.

Huang, J., et al., "A Close Examination of Performance and Power Characteristics of 4G LTE Networks," Proceedings of the 10th International Conference on Mobile Systems, Applications and Services, 2012, 14 pages.

Lee, S., et al., "Exploiting Spatial, Frequency, and Multiuser Diversity in 3GPP LTE Cellular Networks," IEEE Transactions on Mobile Computing, vol. 11, No. 11, Nov. 2012, pp. 1652-1665.

Piro, G., et al., "Two-Level Downlink Scheduling for Real-Time Multimedia Services in LTE Networks," IEEE Transactions on Multimedia, vol. 13, No. 5, Oct. 2011, pp. 1052-1065.

Sadiq, B., et al., "Delay-Optimal Opportunistic Scheduling and Approximations: The Log Rule," IEEE/ACM Transactions on Networking, vol. 19, No. 2, Apr. 2011, pp. 405-418.

Singh, S., et al., "Video Capacity and QoE Enhancements over LTE," IEEE International Conference on Communications, Jun. 10-15, pp. 7071-7076.

Tse, D., "Multiuser Diversity in Wireless Networks," Wireless Communication Siminar, Stanford University, Apr. 16, 2001, 39 pages.

Vetro, A., et al., "The MPEG-DASH Standard for Multimedia Streaming Over the Internet," Industry and Standards, vol. 18, No. 4, Apr. 2011, pp. 62-67.

Pantos, R., Ed., et al., "HTTP Live Streaming," draft-pantos-http-live-streaming-12.txt, Oct. 14, 2013, 42 pages.

"Information Technology—Dynamic Adaptive Streaming Over HTTP (DASH)—Part 1: Media Presentation Description and Segment Formats," International Standard, ISO/IEC 23009-1, First Edition, Apr. 1, 2012, 134 pages.

"[MS-SSTIR]: Smooth Streaming Protocol—v20140124," Copyright 2014 Microsoft Corporation, Feb. 13, 2014, 67 pages.

* cited by examiner

UTILITY-MAXIMIZATION FRAMEWORK FOR DYNAMIC ADAPTIVE VIDEO STREAMING OVER HYPERTEXT TRANSFER PROTOCOL IN MULTIUSER-MULTIPLE INPUT MULTIPLE OUTPUT LONG-TERM EVOLUTION NETWORKS

CROSS-REFERENCE TO RELATED APPLICATIONS

The present application claims benefit of U.S. Provisional Patent Application No. 61/811,623 filed Apr. 12, 2013 by Miao Zhao, et al. and entitled, "Utility-Maximization Framework for Dynamic Adaptive Video Streaming Over HTTP in Multiuser-MIMO LTE Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

With the increased use of mobile devices, video services have become the most demanding applications in wireless networks. This trend has led to the development of dynamic adaptive streaming over hypertext transfer protocol (HTTP) (DASH), where a video source may be encoded in several different alternative bitrates and may be portioned into a plurality of segments for delivery to the clients using HTTP connections. For example, DASH based systems may select different representations of media files (e.g., different resolutions and/or bitrates) based on network conditions to enable adaptive bitrate streaming. DASH may provide automatic tuning to bandwidth to achieve a good visual experience. DASH reuses web servers with HTTP communications instead of relying on real-time streaming protocol (RTSP), real-time transport protocol (RTP), or RTP control protocol (RTCP) based media servers. Recently, the third generation partnership project (3GPP) long-term evolution (LTE) has adopted DASH for use over mobile wireless networks in order to realize ubiquitous multimedia delivery.

In a conventional multi-user multiple-input-multiple-output (MU-MIMO) LTE system, spatial multiplexing gain can be achieved with spatial reuse to enable the transmitter to deliver distinct data streams to multiple receivers simultaneously. Spatial reuse may provide the transmitter choices to opportunistically schedule preferred receivers each time for a common resource. Conventional systems may typically aim to maximize the logarithmic utility regarding the long-term service rate to find a balance between overall throughput and fairness and may rely on time-domain based algorithm. For example, conventional systems may use a proportional fairness algorithm, which may be loosely correlated with specified application features or quality insurance. However, a MU-MIMO LTE system may need a system scheduling policy to utilize the benefits of spatial multiplexing and to provide satisfactory video services.

SUMMARY

In one embodiment, the disclosure includes a method for scheduling user equipment (UE) devices comprising sorting the plurality of UEs based on a weight of priority associated with each of the UEs with respect to a plurality of subbands, and assigning one or more of the UEs to each of the subbands using the weight of priority associated with the UEs, wherein the weight of priority is based on one or more network utility functions associated with the UEs, and wherein a plurality of media content segments are communicated using a DASH protocol when the UEs are assigned to the subbands.

In another embodiment, the disclosure includes a computer program product comprising computer executable instructions stored on a non-transitory computer readable medium such that when executed by a processor causes a UE to receive a media content segment using a DASH protocol, monitor a target requested video rate of the UE device, monitor a playback buffer size of the UE device, monitor a battery energy level of the UE device, and adjust a representation quality level in a segment request based on the target requested video rate, the playback buffer size and the battery energy level, wherein monitoring the playback buffer comprises comparing the playback buffer size to a playback buffer threshold, wherein monitoring the target requested video rate comprises using the average video rate or segment throughput of the UE as well as its current instantaneous supportable data rate on the physical layer with respect to all subbands to derive the target requested video rate, wherein monitoring the battery energy level comprises comparing the battery energy level to a battery energy level threshold, and wherein the UE device implements the DASH protocol using a MU-MIMO LTE network connection.

In yet another embodiment, the disclosure includes an apparatus comprising a receiver configured to receive data from one or more UE devices using a MU-MIMO LTE network connection and receive a segment request, a processor coupled to a memory device and the receiver, wherein the memory comprises computer executable instructions stored on a non-transitory computer readable medium such that when executed by the processor causes the processor to establish an HTTP connection with the UE devices, implement a DASH protocol, and schedule the UE devices to receive a media content segment based on a weight of priority associated with each of the UE devices, and a transmitter coupled to the processor, wherein the transmitter is configured to send a plurality of media content segments in response to the segment request, wherein the weight of priority is a function of the average video rate, the playback buffer size, and the battery energy level associated with the UEs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for scheduling and managing DASH applications for a MU-MIMO LTE system. In particular, the DASH delivery performance may be characterized by a combined network utility function comprising average video rate, playback buffer status, battery energy state, and any other UE and/or network parameters. The network utility function may quantify the DASH performance for UEs based on the aggregate conditions of each UE, such as, the average video rate, playback buffer status, and battery energy state. In one embodiment, a utility-based scheduler may use the combined network utility function to select multiple UEs to share common network resources under the consideration of precoding-based MU-MIMO. Network resources in time, frequency, and spatial domains may be periodically assigned to schedule UEs to maximize a system-wide network utility. Utility-based scheduling may enhance video delivery performance by employing a cross-layer design that jointly optimizes application-layer quality and utilizes the capacity gain introduced by physical-layer techniques. Additionally, the scheduled UEs may further enhance video delivery performance by employing a video rate adaption to request video representation levels by considering available resources, for example, sustainable link capacity, playback buffer status, and battery state. For example, considering sustainable link capacity, playback buffer status, and/or battery state may provide an agile and smooth video rate adaptation.

Figure 1:
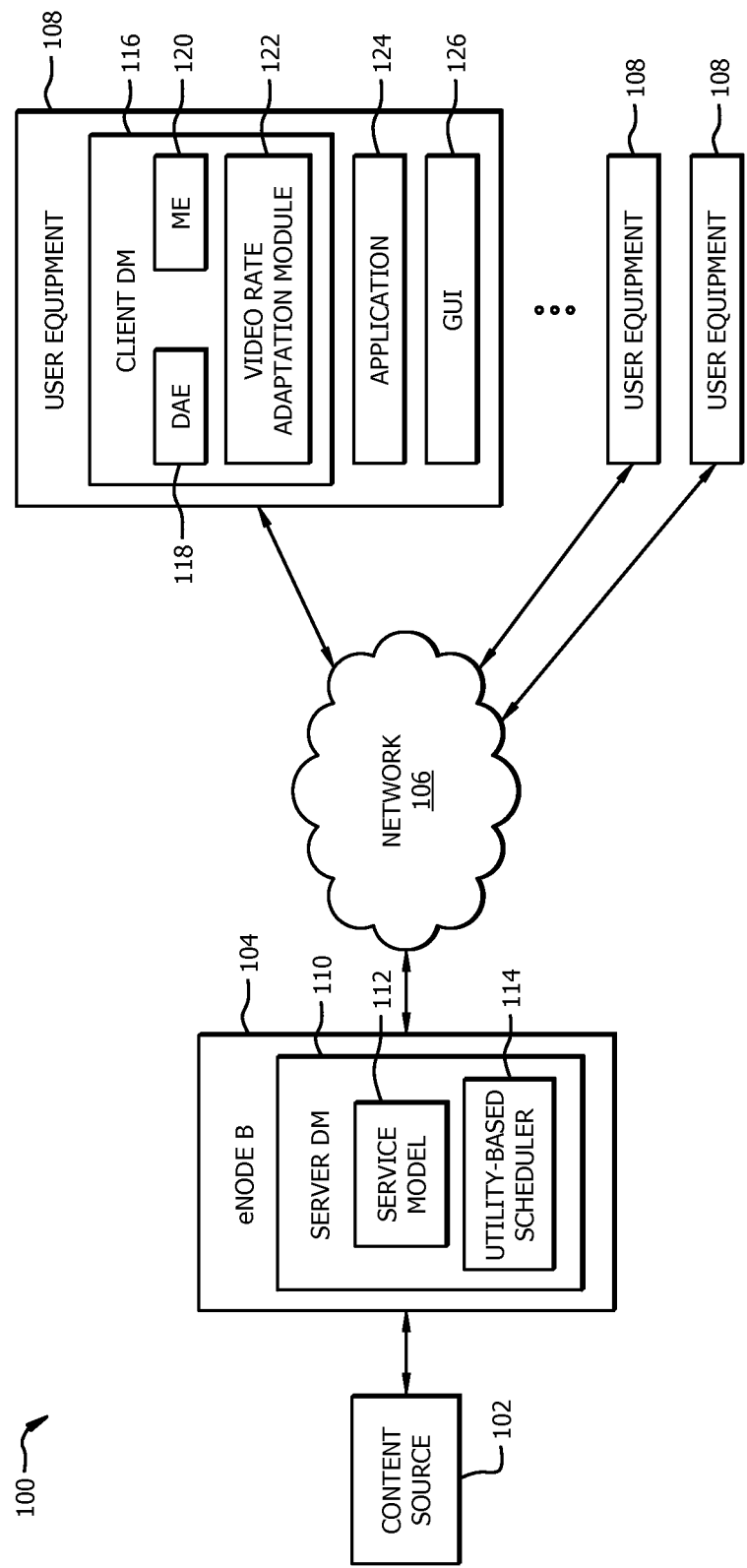
FIG. 1 is a schematic diagram of an embodiment of a DASH over MU-MIMO LTE system.

FIG. 1 is a schematic diagram of an embodiment of a DASH over MU-MIMO LTE system 100. The DASH over MU-MIMO LTE system 100 may generally comprise a content source 102, an evolved universal terrestrial radio access (E-ULTRA) node B (eNodeB) 104, a network 106, and one or more UEs 108. In such an embodiment, the eNodeB 104 and the UEs 108 may be in data communication with each other via the network 106. Additionally, the eNodeB 104 may be in data communication with the content source 102. Alternatively, the DASH over MU-MIMO LTE system 100 may further comprise one or more additional content sources and/or eNodeBs. The network 106 may comprise any network configured to provide data communication between the eNodeB 104 and the UEs 108 along wireless channels. For example, the network 106 may be an Internet or mobile telephone network (e.g., an LTE network). Descriptions of the operations performed by the DASH over MU-MIMO LTE system 100 may generally refer to instances of one or more UEs 108. It is noted that the use of the term DASH throughout the disclosure may include any adaptive streaming, such as HTTP Live Streaming (HLS), Microsoft Smooth Streaming, or Internet Information Services (IIS), and may not be constrained to represent only third generation partnership (3GP)-DASH or moving picture experts group (MPEG)-DASH.

The content source 102 may be a media content provider or distributor which may be configured to deliver various media contents to subscribers or users using different encryption and/or coding schemes suited for different devices (e.g., television, notebook computers, and/or mobile handsets). The content source 102 may be configured to support a plurality of media encoders and/or decoders (e.g., codecs), media players, video frame rates, spatial resolutions, bitrates, video formats, or combinations thereof. Media content may be converted from a source or original presentation to various other representations to suit different users.

The eNodeB 104 may be any network node, such as, a wireless communications base station that comprise a plurality of antennas and configured to wirelessly communicate (e.g., via a cellular connection) with one or more UEs 108. The eNodeB 104 may comprise a server DASH module (DM) 110 configured to send and receive data via HTTP. In one embodiment, the eNodeB 104 may be configured to operate in accordance with the DASH standard described in International Organization for Standardization (ISO) International Electrotechnical Commission (IEC) 23009-1, entitled, "Information Technology Dynamic Adaptive Streaming over HTTP (DASH)—part 1: Media Presentation Description and Segment Formats," which is incorporated herein by reference as if reproduced in its entirety. The eNodeB 104 may be configured to store media content (e.g., in a memory or cache) and/or to forward media content segments. Each segment may be encoded in a plurality of bitrates and/or representations. The eNodeB 104 may form a portion of a content delivery network (CDN), which may refer to a distribution system of servers deployed in multiple data centers over multiple backbones for the purpose of delivering content. A CDN may comprise one or more eNodeBs 104. The eNodeB 104 may further comprise a service model 112 and a utility-based scheduler 114. The service model 112 may be used by a scheduler (e.g., the utility-based scheduler 114) to assign network resources to a plurality of UEs in the time, frequency, and spatial domains by jointly considering the impact of the service rate, the playback buffer status of the UEs 108, the energy states of the UEs 108, and/or other network utility functions. The utility-based scheduler 114 may use the service model 112 to schedule or assign a predetermined number of UEs 108 to subbands such that each subband has a maximum weight of priority and each UE 108 may appear on a single subband.

In an embodiment, a utility-based scheduler 114 may use the service model 112 to assign network resources to a plurality of UEs 108 in the time, frequency, and spatial domains by jointly considering the impact of the utility of each of the UEs 108. The utility of a UE 108 may be characterized by the service rate, the playback buffer status of the UE 108, and the energy states of the UE 108. The service model 112 may employ a combined utility function to characterize the video delivery quality at the UEs 108. In an embodiment, a function for the utility of a UE 108 may be generally expressed by the following equation (in short as Eq.):

$$U_k(\bar{r}, q, b) = U_r(\bar{r}_k) - C_q(q_k - q_T) - C_b(b_k - b_T). \quad (1)$$

In Eq. (1), the $U_r(\bullet)$ component may be a concave (e.g., strictly concave), monotonically increasing, and twice-differentiable utility function with respect to the average video rate. In other words, the $U_r(\bullet)$ component may be a function with one or fewer maxima and the second derivative of the function may remain negative for all average video rates in a set. The average video rate may be notated by the term $\bar{r}_k$. The $C_q(\bullet)$ component may be a convex (e.g., strictly convex), decreasing, and twice-differentiable cost function regarding a playback buffer. In other words, the $C_q(\bullet)$ component may be a function with one or fewer minima and the second derivative of the function may remain positive for all playback buffer sizes in a set. The number of video frames in the playback in a UE may be notated by the term $q_k$ and the minimum acceptable buffer size of a UE may be notated by the term $q_T$. Additionally, the $C_b(\bullet)$ component may be a convex (e.g., strictly convex), decreasing, and twice-differentiable cost function regarding a battery energy level or state. In other words, the $C_b(\bullet)$ component may be a function with one or fewer minima and the second derivative of the function may remain positive for all battery energy levels or states in a set. The remaining battery energy of a UE may be denoted by the term $b_k$ and the low energy threshold of a UE may be denoted by the term $b_T$.

The $U_r(\bullet)$, $C_q(\bullet)$, and $C_b(\bullet)$ components may be expressed using any suitable form. For example, the $U_r(\bullet)$ component may be expressed by the function $U_r = \omega_k \log(\bar{r}_k)$, where $\omega_k$ is the weight of utility that reflects the importance of the video service for different users (e.g., very important person (VIP) or non-VIP). The $C_q(\bullet)$ component may be expressed by the function $C_q = \alpha \exp(-\beta(q_k - q_T))$ and may imply that when the video frames in the playback buffer $q_k$, drops below the playback buffer threshold $q_T$ the cost may sharply increase forcing the utility-based scheduler to serve users in urgent need of data. The terms $\alpha$ and $\beta$ may represent positive constant coefficients used in the function. The $C_b(\bullet)$ component may be expressed by the function $C_b = \mu \exp(-\gamma(b_k - b_T))$ and may imply that the low battery energy may cause the utility-based scheduler to timely serve a UE 108, when the UE 108 does not have sufficient available energy in order to avoid wasting energy while waiting. The terms $\mu$ and $\gamma$ may represent positive constant coefficients used in the function. Accordingly, the network utility may be generally expressed as the aggregation of the utility of a plurality of the UEs 108 in a cell and may be expressed by the following equation:

$$\max U(\vec{r}, \vec{q}, \vec{b}) = \Sigma_{k \in K} U_k(\bar{r}_k, q_k, b_k) \quad (2)$$

Maximizing the network utility of all of the UEs 108 may maintain a video service quality while fully utilizing the benefit of MU-MIMO. Maximizing the network utility function may comprise finding appropriate UEs 108 for service and assigning the UEs 108 to subbands during each transmission time interval (TTI), such that, each subband may simultaneously accommodate multiple co-scheduled UEs 108. An optimal subband assignment for the UEs may change over time as a result of the channel conditions being time-varying. Therefore, moving in the directions of steepest ascent at each scheduling point may provide continuous movement towards the "present" subband assignment solution. For example, a scheduler may serve a particular set of UEs 108 which maximizes a gradient of network utility in order to move in the direction of steepest ascent. A UE 108 that is served in any subband during a current TTI may be moved in a direction to achieve a maximum aggregate of network utility gradient for a video service.

A utility-based scheduling policy may be derived using a network utility function. A network utility function may be a function of the available resources with respect to a UE 108 based on the conditions (e.g., channel conditions) of the network, and may be expressed in terms of average video rate, playback buffer size, and available battery energy. Table 1 provides a list of notations used by the present disclosure.

TABLE 1

List of notations

| Notations | Definitions |
|---|---|
| K | Set of all UEs |
| $K_p$ | Set of served UEs in a schedule period, $K_p \in K$ |
| S | Set of subbands |
| P | Set of precoders |
| $N_c$ | Set of subcarriers spanning entire frequency channel |
| $N_c^s$ | Set of subcarries in subband s |
| M | Number of transmit antennas at eNodeB |
| N | Number of receive antennas at each UE |
| $H_k^c$ | Channel coefficient matrix between eNodeB and UE k on subcarrier c |
| L | Total number of concurrently served UEs on a subband |
| $r_{k,s}(t)$ | Supportable data rate of UE k on subband s for TTI t |
| $K_s$ | Set of UEs on subband s, $K_s \subseteq K$ |
| $B_s$ | Bandwidth of subband s |
| $q_k$ | Playback buffer size of UE k |
| $b_k$ | Battery power headroom of UE k |
| $I_{k,s}$ | Indicator whether UE k is scheduled on subband s, $I_{k,s} = \{0, 1\}, \forall k \in k, s \in S$ |
| $\bar{r}_k$ | Average video rate of UE k within sliding window |
| $\hat{v}_k(n)$ | The target requested video bitrate by UE k for video segment n |
| $r_k$, sg | Segment throughput of UE k |
| $v_k(n)$ | Requested video bitrate by UE k for video segment n |
| $l_k(n)$ | Video bitrate representation level for video segment n |
| m | Counter threshold for UE to request for video segment representation with higher bitrate |

A set of UEs 108 served in a current TTI may be expressed by the term $\kappa_p$. A set of UEs 108 not served in the current TTI may be expressed by the term $\kappa_{\bar{p}}$. The set of UEs 108 served in the current TTI and the set of UEs 108 not served in the current TTI may form a complete set of UEs 108 $\kappa$ (e.g., $\kappa_p \cup \kappa_{\bar{p}} = \kappa$). Additionally, the set of UEs 108 served in the current TTI and the set of UEs 108 not served in the current TTI may be mutually exclusive (e.g., $\kappa_p \cap \kappa_{\bar{p}} = \phi$).

In the $U_r(\bullet)$ component of the network utility function, the average video rate $\bar{r}_k$ for a UE may be a function that uses a constant time window W to smooth the average video rate. For example, the constant time window may be in terms of a number of TTIs. The average video rate for the (t+1)-th TTI may be expressed as:

$$\bar{r}_k(t+1) = \frac{W-1}{W} \cdot \bar{r}_k(t) + \frac{1}{W} \cdot \sum_{s \in S} r_{k,s}(t) I_{k,s}(t), \quad (3)$$

where $\bar{r}_k(t)$ is the average video rate near the beginning of the t-th TTI, $r_{k,s}(t)$ is the supportable data rate of UE k on subband s based on the wideband precoder matric indicator (PMI) of the UE 108 in the current TTI, and $I_{k,s}(t)$ is the indicator whether UE k is served on subband s during the current TTI.

A scheduling policy may be configured such that during each TTI a UE 108 may be served on a single subband (i.e., $\Sigma_{s \in S} I_{k,s}=1$). Such a scheduling policy may facilitate short-term fairness among the UEs 108 and/or may provide service to more UEs 108 during each TTI. Parameterizing the average video rate for movement along the directions corresponding to the set of UEs 108 served, by a small step $\epsilon$, may be expressed as:

$$U^\epsilon_{K_p}(\vec{r}) = \sum_{k \in K} U_r(\bar{r}_k(t) + \epsilon(\bar{r}_k(t+1) - \bar{r}_k(t))) \quad (4)$$

$$= \sum_{k \in K_p} U_r\left(\bar{r}_k(t) + \frac{\epsilon}{W} \cdot \left(\sum_{s \in S} r_{k,s}(t) I_{k,s}(t) - \bar{r}_k(t)\right)\right) +$$

$$\sum_{k \in K_p} U_r\left(\bar{r}_k(t) - \frac{\epsilon}{W} \bar{r}_k(t)\right),$$

where the first summation term in the second equality expresses the rate change for the served UEs 108 and the second summation term in the second equality expresses the average rate degradation for non-scheduled UEs 108. A maximum gradient for the average video rate may be determined by differentiating Eq. (4) with respect to $\epsilon$ and evaluating the function at $\epsilon=0$, and may result in the following equation:

$$U'_{K_p}(\vec{r}) = \sum_{k \in K_p} U'_r(\bar{r}_k(t)) \cdot \frac{1}{W}\left(\sum_{s \in S} r_{r,s}(t) I_{k,s}(t) - \bar{r}_k(t)\right) - \quad (5)$$

$$\sum_{k \in K_p} U'_r(\bar{r}_k(t)) \cdot \frac{1}{W} \bar{r}_k(t)$$

$$= \sum_{k \in K_p} U'_r(\bar{r}_k(t)) \frac{\sum_s r_{k,s}(t) I_{k,s}(t)}{W} - \sum_{k \in K} U'_r(\bar{r}_k(t)) \frac{\bar{r}_k(t)}{W}.$$

Eq. (5) may implicitly indicate when the average video rate may be individually considered. The scheduled UEs selection and the subband assignment may follow the directions of the maximum aggregate gradient. For example, the directions of the maximum aggregate gradient may be equivalent to maximize the value of the first summation term of the second equality of Eq. (5), since the second summation term of the second equality of Eq. (5) may be common to all directions and may be omitted.

In the $C_q(\bullet)$ component of the network utility function, the playback buffer size $q_k$ of a UE 108 may be updated after each TTI and may be expressed as:

$$q_k(t+1) = \max\{q_k(t) - f_r D_t, 0\} + \frac{D_t \sum_{s \in S} r_{k,s}(t) I_{k,s}(t)}{S_f(t)}, \quad (6)$$

where $S_f$ is the size of current video frame in transition, $D_t$ is the time duration of a TTI, and $f_r$ is the video frame rate. In Eq. (6), the first term on the right side of the equation (e.g., $\max\{\bullet\}$) may indicate the remaining number of video frames in the buffer after playing. The second term on the right side of the function (e.g., $$\left(\text{e.g., } \frac{D_t \sum_{s \in S} r_{k,s}(t) I_{k,s}(t)}{S_f(t)}\right)$$

may indicate the number of incoming video frames as the buffer replenishes during the current scheduling period. Parameterizing the playback buffer for movement along the directions corresponding to the set of UEs 108 served, by a small step $\epsilon$, may be expressed as:

$$-U^\epsilon_{K_p}(\vec{q}) = \sum_{k \in K} C_q(q_k(t) + \epsilon(q_k(t+1) - q_k(t))) = \quad (7)$$

$$\sum_{k \in K_p} C_q\left(q_k(t) + \epsilon \cdot \left(\frac{D_t \sum_{s \in S} r_{k,s}(t) I_{k,s}(t)}{S_f(t)} - f_r D_t\right)\right) +$$

$$\sum_{k \in K} C_q(q_k(t) - \epsilon \cdot f_r D_t).$$

A maximum gradient for the playback buffer may be determined by differentiating Eq. (7) with respect to $\epsilon$ and evaluating the function at $\epsilon=0$, may be expressed as:

$$-U'_{K_p}(\vec{q}) = \quad (8)$$

$$\sum_{k \in K_p} C'_q(q(t)) \left(\frac{D_t \sum_{s \in S} r_{k,s}(t) I_{k,s}(t)}{S_f(t)} - f_r D_t\right) - f_r D_t \sum_{k \in K} C'_q(q_k(t)) =$$

$$\sum_{k \in K_p} C'_q(q_k(t)) \frac{D_t \sum_{s \in S} r_{k,s}(t) I_{k,s}(t)}{S_f(t)} - f_r D \sum_{k \in K} C'_q(q_k(t)).$$

To maximize the gradient of network utility function with respect to the playback buffer, a direction may be chosen that maximizes the value of the first summation term of the second line of Eq. (8). The second term of the second line of Eq. (8) may be omitted, as it is common to all directions.

In the $C_b(\bullet)$ component of the network utility function, the battery energy $b_k$ of a UE 108 may be updated after each TTI and may be expressed as follows:

$$b_k(t+1) = \max\{b_k(t) - (e_k \Sigma_{s \in S} r_{k,s}(t) I_{k,s}(t) + \partial_k) D_t, 0\}, \quad (9)$$

where $e_k$ is the power consumption for receiving a unit throughput during a TTI and $\delta_k$ stands for the circuit power consumption. The circuit power consumption may comprise the power consumed by the circuit blocks for decoding, processing, displaying, and/or any other circuits along the signal path. Parameterizing the battery energy for movement along the directions corresponding to the set of UEs 108 served, by a small step $\epsilon$, may be expressed as:

$$-U^\epsilon_{K_p}(\vec{b}) = \sum_{k \in K} C_b(b_k(t) + \epsilon(b_k(t+1) - b_k(t))) = \quad (10)$$

-continued $$\sum_{k \in K} C_b \left( b_k(t) - \varepsilon \cdot \left( e_k \sum_{s \in S} r_{k,s}(t) I_{k,s}(t) + \partial_k \right) D_t \right) +$$

$$\sum_{k \in K} C_b(b_k(t) - \varepsilon \partial_k D_t).$$

A maximum gradient for the battery energy may be determined by differentiating Eq. (10) with respect to $\epsilon$ and evaluating the function at $\epsilon$=0, may be expressed as:

$$-U'_{K_p}(\vec{b}) = -\sum_{k \in K_p} C'_b(b_k(t) \cdot e_k D_t(\sum_{s \in S} r_{k,s}(t) I_{k,s}(t)) - \sum_{k \in K} \partial_k C'_b(b_k(t)) D_t. \quad (11)$$

To maximize the gradient direction of network utility with respect to battery energy, a direction may be chosen that maximizes the value of the first summation term on the right side of Eq. (11).

In an embodiment, utility-based scheduling may be expressed mathematically using the using the results from Eq. (5), (8), and (11) and the requirements for precoding-based MU-MIMO. For example, using Eq. (5), (8), and (11) to maximize the gradient with respect to the average video rate, the playback buffer size, and the battery energy, respectively, we may express utility-based scheduling as follows:

$$\{K_p, I_{k,s}\}^* = \arg \quad (12)$$

$$\max_{K_p, I} \left\{ \sum_{k \in K} \left( U'_r(\bar{r}_k) \frac{\sum_s r_{k,s}(t) I_{k,s}(t)}{W} - C'_q(q_k(t)) \frac{D_t \sum_s r_{k,s}(t) I_{k,s}(t)}{s_f(t)} + e_k D_t \cdot C'_b(b_k(t)) \left( \sum_s r_{k,s}(t) I_{k,s}(t) \right) \right) \right\},$$

s.t.

$$\begin{cases} \sum_{s \in S} I_{k,s} = 1, & \forall k \in K \\ \sum_{k \in K} I_{k,s} \leq L, & \forall s \in S \\ I_{k,s} \cdot I_{k',s} \neq 1, & \text{if } Idx_k^p = Idx_{k'}^p, \forall k, k' \in K \text{ and } k \neq k' \\ |K_p| = \sum_{k \in K} \sum_{s \in S} I_{k,s} \leq L|S|. & K_p \subseteq K, \end{cases} \quad (13)$$

where $\kappa$ is a set of UEs, $\kappa_p$ is the set of UEs served, S is a set of subbands for each TTI, $I_{k,s}$ indicates if UE k is being served by subband S, and L is the number of co-scheduled UEs 108 in a common subband. The expression for utility-based scheduling, as shown by Eq. (12), may indicate that each UE 108 may have a corresponding weight regarding different subbands in a TTI. The corresponding weight regarding may be referred to as a weight of priority. The weight of priority for UE k and a subband S may be noted using the term $\lambda_{k,s}$ and may be expressed as follows:

$$\lambda_{k,s}(t) = \frac{r_{k,s}(t)}{W} U'_r(\bar{r}_k) - C'_q(q_k(t)) \frac{r_{k,s}(t) D_t}{s_f(t)} + e_k D_t \cdot C'_b(b_k(t)) r_{k,s}(t), \quad (14)$$

where $\lambda_{k,s}(t)$ is the weight of priority of UE k on subband s, $r_{k,s}(t)$ is the supportable data rate of UE k on subband s, W is a constant time window, $U'_r(\bar{r}_k)$ is the gradient of function $U_r$ at UE k in terms of average video rate, $C'_q(q_k(t))$ is the gradient of function $C_q$ at UE k in terms of playback buffer size, $D_t$ is a time duration of a TTI, $s_f(t)$ is the size of the current video frame in transition, $e_k$ is the power consumption for receiving a unit throughput, $C'_b(b_k(t))$ is the gradient of function $C_b$ at UE k in terms of battery energy. In other words, the first term may account for the average video rate, the second term may account for the playback buffer size, and the third term may account for the battery energy level. Based on the definition of the weight of priority in Eq. (14), Eq. (12) may be converted to explore an optimal scheduling solution that may maximize the aggregate weight of priority under the constraints and may be expresses as the following:

$$\{I_{k,s}\}^* = \arg \max_I \sum_{s \in S} \sum_{k \in K} \lambda_{k,s}(t) I_{k,s}, \text{ s.t. Eq. (13)}. \quad (15)$$

Additionally, the first formula of Eq. (13) may be a subband assignment constraint which may indicate the number of subbands that each UE 108 may be scheduled to serve. For example, the subband assignment constraint may enforce that each UE 108 may be scheduled to serve on at most one subband in each TTI. The second formula in Eq. (13) may be a spatial degrees-of-freedom constraint which may indicate the number of co-scheduled UEs 108 in each subband is bounded by the degrees-of-freedom in the downlink. The number of co-scheduled UEs 108 may be limited by the number of UE 108 and the number antennas at the eNodeB 104 (e.g., L=min(M,|κ|)). The third formula of Eq. (13) may be precoder selection constraint which may restrict the number of UEs that may select the same precoder (e.g., a precoder with the same precoder matrix indicator (PMI) feedback). For example, the precoder selection restraint may enforce that any two UEs 108 that select the same precoder may not be scheduled on the same subband, otherwise, the distinct data for each UE 108 may not be successfully decoded due to interference. As such, any two UEs 108 sharing the same PMI may conflict with each other. The fourth formula in Eq. (13) may be a served-UE set size constraint which may indicate the number of UEs served may be limited by the product of the number of subbands and the number of spatial degrees of freedom.

A UE 108 may comprise a plurality of antennas and may be configured to communicate data with the eNodeB 104. For example, a UE 108 may be a notebook computer, a tablet computer, a desktop computer, a mobile telephone, or any other device. A UE 108 may comprise a client DM 116, an application 124, and a graphical user interface (GUI) 126. The client DM 116 may be configured to send and receive data via HTTP and a DASH protocol (e.g., ISO/IEC 23009-1). The client DM 116 may comprise a DASH access engine (DAE) 118, a media output (ME) 120, and a video rate adaptation module 122. The DAE 118 may be configured as the primary component for receiving raw data from the eNodeB 104 (e.g., the server DM 110) and constructing the data into a format for viewing. For example, the DAE 118 may format the data in MPEG container formats along with timing data, then output the formatted data to the ME 120. The ME 120 may be responsible for initialization, playback, and other functions associated with content and may output that content to the application 124. The video rate adaptation module 122 may be configured to dynamically request video segments encoded in different bitrates and/or representation levels based on available network resources, the playback buffer status of a UE 108, and/or the battery status of the UE 108.

The application 124 may be a web browser or other application with an interface configured to download and present content. The application 124 may be coupled to the GUI 126 so that a user associated with the UE 108 may view the various functions of the application 124. In an embodiment, the application 124 may comprise a search bar so that the user may input a string of words to search for content. If the application 124 is a media player, then the application 124 may comprise a search bar so that the user may input a string of words to search for a movie. The application 124 may present a list of search hits, and the user may select the desired content (e.g., a movie) from among the hits. Upon selection, the application 124 may send instructions to the client DM 116 for downloading the content. The client DM 116 may download the content and process the content for outputting to the application 124. For example, the application 124 may provide instructions to the GUI 126 for the GUI 126 to display a progress bar showing the temporal progress of the content. The GUI 126 may be any GUI configured to display functions of the application 124 so that the user may operate the application 124. As described above, the GUI 126 may display the various functions of the application 124 so that the user may select content to download. The GUI 126 may then display the content for viewing by the user.

The eNodeB 104 may be configured to use a linear transmit precoding to multiplex the signals for different UEs 108 that may share a common resource unit. The eNodeB 104 and the UEs 108 may comprise M and N antennas, respectively, and may employ Orthogonal frequency-division multiplexing (OFDM). OFDM may reduce intersymbol interference by converting a broadband frequency selective channel into a series of parallel narrowband flat fading channels while MU-MIMO may provide service to multiple UEs 108 simultaneously on each frequency channel. A MU-MIMO-OFDM transmission with a single data stream per user may employ a linear precoding on each subcarrier, which may be seen as a series of parallel MU-MIMO systems, each with a flat fading channel resulting from a length-$|N_c|$ discrete Fourier transform (DFT) operation applied to the multi-tap frequency selective channel. On each subcarrier, the distinct bit streams destined for different UEs 108 may be demultiplexed into multiple substreams over different antennas. By using MU-MIMO, multiple UEs 108 may share a common network resource, which may provide the eNodeB 104 options for selecting optimal receivers based on specified schedule principles (e.g., the utility-based scheduling policy). Multiple UEs 108 may be simultaneously scheduled on a set of consecutive resource blocks (RBs) (e.g., a subband). On each subband, premultiplying the transmitted data streams by a precoding matrix that is chosen based on channel statistics at a transmitter may be an efficient multiplexing approach to dampen the interference among co-scheduled UEs. A transmitter precoder may be selected from a finite set of precoding matrices (e.g., a codebook) which may be known by both the eNodeB and the UEs. Each UE may select a preferred precoder vector according to its current channel state and may report a wideband PMI and subband channel quality indicator (CQI) to the serving eNodeB 104.

The eNodeB 104 may periodically send or transmit pilot signals to one or more (e.g., all) of the UEs 108. The UEs 108 may be configured to use the pilot signals to determine PMIs and/or CQIs. A PMI may represent an index of preferred codewords in a codebook. A CQI may indicate the strength of the channel quality of the subband corresponding to the reported PMI. The PMI and the CQI may infer the supportable quantized data rate that a UE 108 estimates over a preferred spatial direction on the corresponding subband. In an embodiment, to save uplink bandwidth, the rank of all the PMIs may be reported by similar components of the UEs 108 and such that a common rank corresponds to rank-1. A maximum number of codewords that may be transmitted to each UE 108 may be limited by and/or about equal to the rank of the precoding matrices, and therefore, each UE 108 may be assigned with one codeword. Each UE 108 may be configured to report one PMI (e.g., wideband PMI) that may be identical across all subbands and one CQI per codeword per subband to the eNodeB 104. For example, a UE 108 may be configured to select a preferred precoder vector according to the channel state of the UE 108 and may report the PMI and subband CQI to the eNodeB 104.

The eNodeB 104 may be configured to receive feedback from the UEs 108 and to select the UEs 108 to serve in each subband during each TTI. The UE 108 selection may be based on the service model 112 to maximize system-wide network utility. In a downlink control channel, the eNodeB 104 may send scheduling information to each scheduled UE 108. The scheduling information may comprise resource block assignments, modulation constellation per codeword, coding rate per codeword, PMIs used, transmit power levels, and/or any other suitable information as would be appreciated by one of ordinary skill in the art upon viewing this disclosure. As such, the eNodeB 104 may be configured to serve multiple users simultaneously in the frequency, spatial, and time domains while guaranteeing a video delivery quality for the scheduled UEs 108.

The eNodeB 104 may be configured to determine a number of potential UE candidates for a MU-MIMO transmission on a subband. For example, the number of potential UE candidates may be represented as $L \leq \min(M,|\kappa|)$, where L represents the number of potential UE candidates, M represents the number of eNodeB 104 antennas, and κ represents the number of UEs in a set. In an embodiment, a small number of UEs 108 may be relatively trivial when $|\kappa| \ll L \cdot |S|$ (e.g., the number of total UEs is much smaller than possible quotas that all subbands can accommodate with), where S represents a set of subbands across a channel.

Transmit precoding vectors may be denoted by $w_j$ and may imply that the UEs 108 may be restricted to be scheduled on the spatial directions indicated by the PMI to reduce or cancel out interference. The transmit precoding vectors $w_j$ may be unit vectors (e.g., $\|w_j\|^2 = 1$). To determine a PMI and/or a CQI, a UE 108 may search all the precoding vectors to determine the precoding vector that corresponds to the spatial direction that may provide the best performance. The received symbol estimated at UE k on a single subcarrier may be expressed as:

$$\hat{y}_k = u_k * H_k w_l x_k + u_k * H_k \sum_{\substack{j=1,2,\dots,L \\ j \neq L}} w_j x' + u_k * n_k, \quad (16)$$

where $\hat{y}_k$ is the estimated receiving symbol, $H_k$ is the N×M MIMO channel matrix between the eNodeB 104 and UE k, $w_l$ denotes one of the standardizing precoding vectors with the dimension of M×1, $u_k$ is the N×1 receiving combination vector at UE k, and $n_k$ is the additive Gaussian noise vector. Additionally, $x_k$ denotes the transmitted scalar symbol for the co-scheduled UE assigned with precoder $w_j$. The eNodeB 104 may equally distribute transmission power among the co-scheduled UEs 108. An UE 108 may determine its wideband PMI and subband CQI using the following principle:

$$\text{PMI: } Idx_k^p = I\left(\operatorname{argmax}_{w_l}\left(\sum_{c \in N_c} \frac{1/L \cdot P_T \cdot |u_l * H_k^c w_l|^2}{1/L \cdot P_T \cdot \sum_{j \neq l} |u_l * H_k^c w|^2 + \sigma^2}\right)\right) \quad (17)$$

$$\text{CQI: } Idx_{k,s}^c =$$

$$Q\left(\frac{1}{|N_c^s|}\sum_{c \in N_c^s} \frac{1/L \cdot P_T \cdot T \left|u_{Idx_k^p} * H_k^c w_{Idx_k^p}\right|^2}{1/L \cdot P_T \cdot \sum_{j \neq l}\left|u_{Idx_k^p} * H_k^c w_j\right|^2 + \sigma^2}, B_s, RS_k\right),$$

where $Idx_k^p$ and $Idx_{k,s}^p$ represents the wideband precoder index and the CQI index for each subband s of UE k, $P_T$ is the total transmit power per subcarrier, $RS_k$ is the receive sensitivity of UE k, $I(\bullet)$ is the function that maps the selected precoding vector to its index in the codebook, and $Q(\bullet)$ is the function that derives the CQI index based on average downlink signal-to-interference plus noise ratio (SINR) across all subcarriers in the subband and the received sensitivity of the UE 108 in order to guarantee an upper bound of bit error rate. The PMI and the CQI information may be periodically sent to the eNodeB 104 by the UE 108 via a physical uplink control channel (PUCCH). Using the feedback information (e.g., the PMI and/or the CQI of a UE), the eNodeB 104 may determine the channel state of a UE 108 for a particular subband. For example, the $r_{k,s}$ data transmission rate which may represent the estimated achievable data rate of UE k on subband s for the current TTI may be derived using the CQI.

Figure 2:
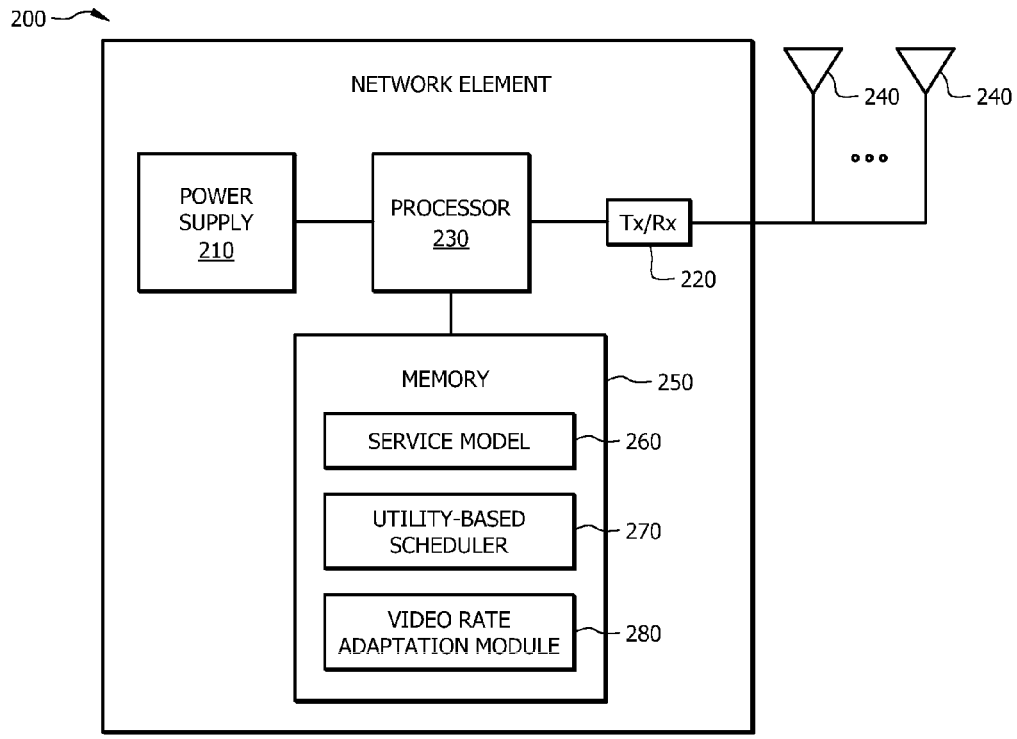
FIG. 2 is a schematic diagram of an embodiment of a network element.

FIG. 2 is a schematic view of an embodiment of a network element 200 that may be used to transport and process data traffic through at least a portion of a DASH over MU-MIMO LTE system 100 shown in FIG. 1. At least some of the features/methods described in the disclosure may be implemented in a network element. For instance, the features/methods of the disclosure may be implemented in hardware, firmware, and/or software installed to run on the hardware. The network element 200 may be any device (e.g., a base station, an eNodeB, a UE, a mobile communications device, etc.) that transports data through a network, system, and/or domain. Moreover, the terms network "element," "node," "component," "module," and/or similar terms may be interchangeably used to generally describe a network device and do not have a particular or special meaning unless otherwise specifically stated and/or claimed within the disclosure. In one embodiment, the network element 200 may be an apparatus configured to construct a service model, to perform utility-based scheduling, to perform video rate adaptation, to implement DASH, to establish and communicate via a cellular connection (e.g., LTE), and/or to establish and communicate via an HTTP connection. For example, network element 200 may be or incorporated with an eNodeB 104 and/or a UE 108 as described in FIG. 1.

The network element 200 may comprise one or more antennas 240 coupled to a transceiver (Tx/Rx) 220, which may be transmitters, receivers, or combinations thereof. The Tx/Rx 220 may transmit and/or receive data (e.g., packets) from other network elements wirelessly via one or more antennas 240. For example, the antennas 240 may be a MIMO antenna and may be configured to send and receive orthogonal frequency-division multiple access (OFDMA) signals.

A processor 230 may be coupled to the Tx/Rx 220 and may be configured to process the frames and/or determine which nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to implement any of the schemes to implement utility-based scheduling and/or video rate adaptation.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the system and methods described herein. In one embodiment (e.g., eNodeB), the memory module 250 may comprise a service model 260 and a utility-based scheduler 270 that may be implemented on the processor 230. Alternatively, the service model 260 and the utility-based scheduler 270 may be implemented directly on the processor 230. The service model 260 may be configured to implement functions as described in FIG. 1's service model 112. The utility-based scheduler 270 may be configured to implement functions as described in FIG. 1's utility-based scheduler 114. In another embodiment (e.g., UE), the memory module 250 may comprise a video rate adaptation module 280 that may be implemented on the processor 230. Alternatively, the video rate adaptation module 280 may be implemented directly on the processor 230. The video rate adaptation module 280 may be configured to implement functions as described in FIG. 1's video rate adaptation module 122.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-RW), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The network element 200 may further comprise a power supply 210 coupled to the processor 230. The power supply 210 may be configured to supply electrical power to the processor 230 and/or any other components of the network element 200. The power supply 210 may comprise an on-board battery, a renewable power source, a voltage source, a current source, or any other suitable power source as would be appreciated by one of ordinary skill in the art upon viewing this disclosure. For example, the power supply 210 may be a Galvanic cell. Additionally, the processor 230 may be configured to determine the available energy or power available from the power supply 210. For example, the processor 230 may be configured to determine a battery energy level.

Figure 3:
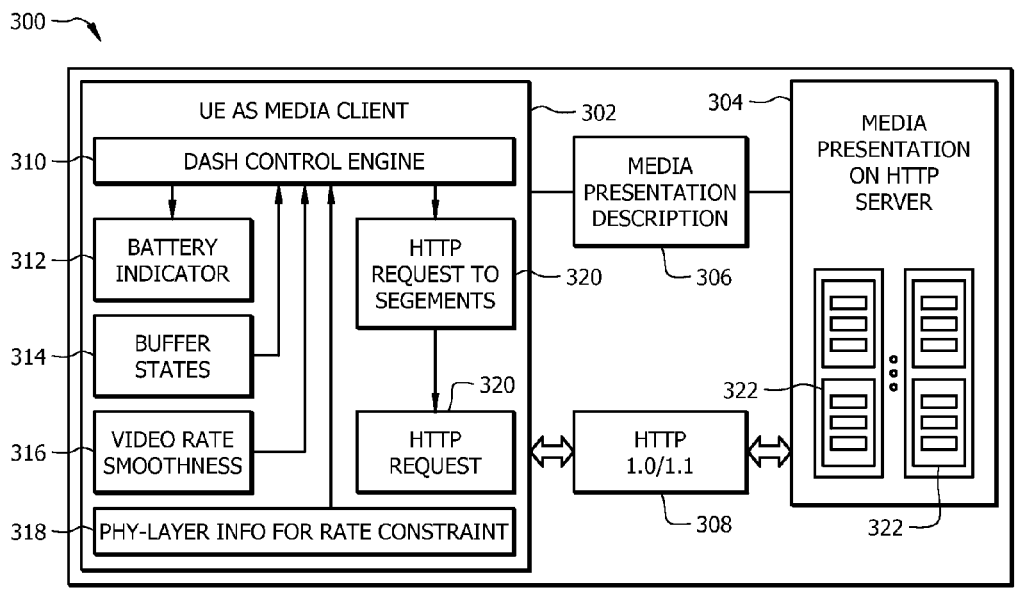
FIG. 3 is a schematic diagram of an embodiment of an application layer view of a DASH over MU-MIMO LTE network.

FIG. 3 is a schematic diagram of an embodiment of an application layer view of a DASH over MU-MIMO LTE network 300. The DASH over MU-MIMO LTE network 300 comprises UEs as media client 302 and a media presentation on an HTTP server 304. For example, the media client 302 may be implemented by a UE (e.g., UE 108 as described in FIG. 1) and the HTTP server 304 may be implemented by an eNodeB (e.g., eNodeB 104 as described in FIG. 1). The media client 302 may be configured to communicate with the HTTP server 304 using an HTTP connection 308. The media client 302 may comprise a DASH control engine 310. The DASH control engine 310 may be configured to output to a battery indicator 312 and to output an HTTP request 320. For example, the battery indicator 312 may indicate the available battery energy. The HTTP request 320 may be used to request a media content segment from the HTTP server 304. The DASH control engine 310 may also be configured to receive buffer states 314, a video rate smoothness 316, and/or physical-layer data 318. For example, the buffer states 314 may indicate the current size of a playback buffer. The video rate smoothness 316 may indicate the fluctuations in video rate changes. The physical-layer data 318 may indicate data rate constraints from the physical layer. The HTTP server 304 may comprise a plurality of media content representations 322. For example, the media content representations 322 may be a plurality of media content segments with different quality levels and/or bit rates.

The HTTP server 304 may be configured to send a media presentation description (MPD) 306 to the media client 302 prior to transmitting media content segments. An MPD may describe a manifest of available content, alternatives for the available content, uniform resource locator (URL) addresses, and/or other characteristics. An MPD is described in more detail in the ISO/IEC document 23009-1. The media client 302 may stream media content by requesting segments of the media content at a certain level of quality via the HTTP connections 308. The requested level of quality may be determined based on the effective network bandwidth, the playback buffer status of the media client 302, and the energy states of the media client 302, which may provide an agile and smooth video rate adaptation on the application layer. On the media access control (MAC) layer, during each scheduling period, the eNodeB may choose one or more media UEs for DASH service. For example, the eNodeB may choose UEs based on the achievable system-wide DASH performance and the full utilization of network resources.

Figure 4:
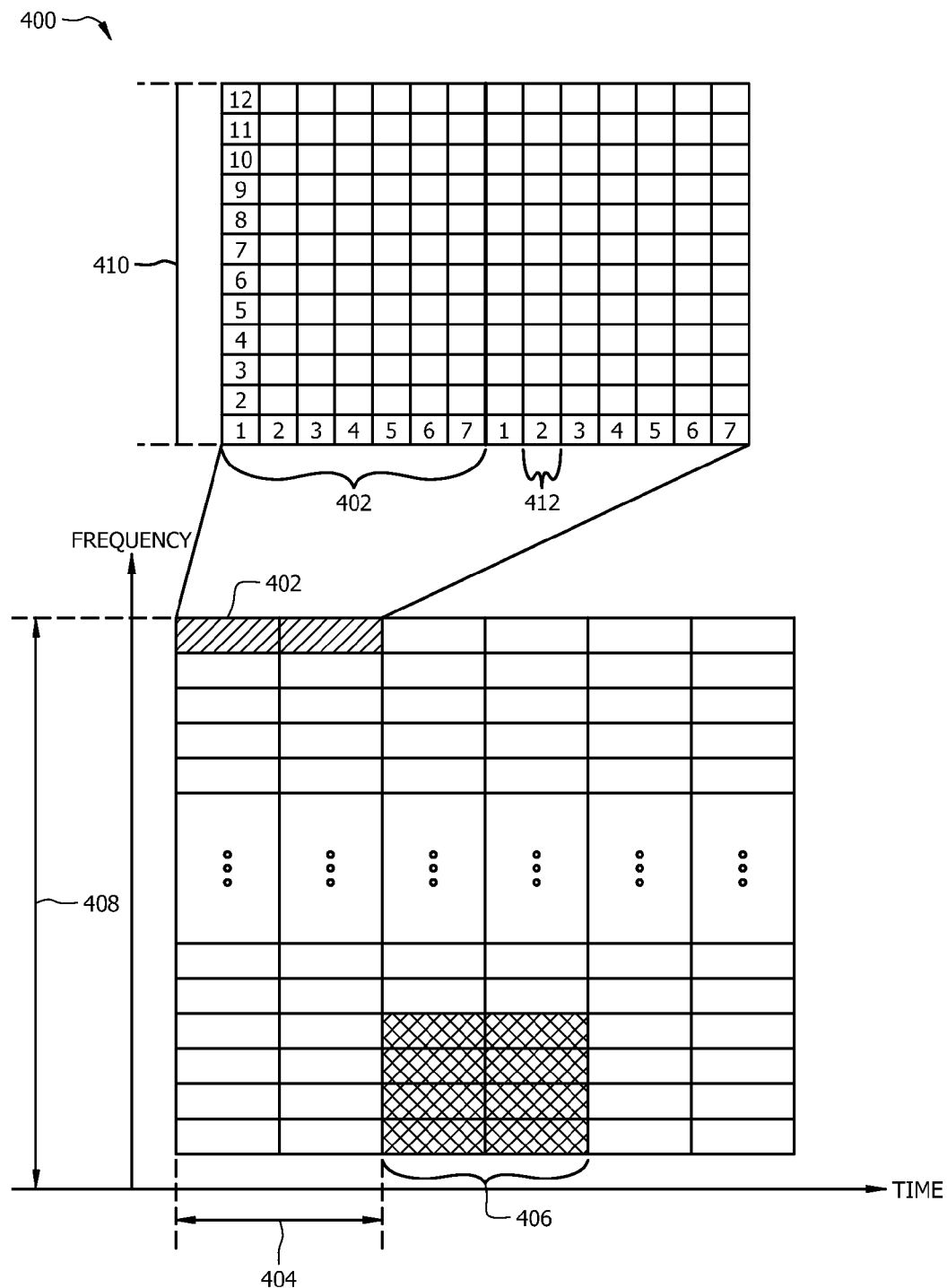
FIG. 4 is a plot of an embodiment of a physical layer communication technique over time.

FIG. 4 is a plot of an embodiment of a physical layer communication technique over time 400. The physical-layer communication technique 400 may employ an OFDMA-based MU-MIMO. For example, the physical-layer communication technique 400 may be LTE. A basic network resource unit in LTE may be an RB 402, which may comprise of about 12 contiguous OFDM subcarriers 410 with each OFDM subcarrier having a duration of about 0.5 milliseconds (ms). Each OFDM subcarrier 410 may comprise of about seven OFDM carrier symbols 412. A scheduling period may be referred to as a TTI 404 and may be about 1 ms. As such, an RB 402 may be referred to as being in the frequency-domain. An RB 402 may be reserved during each TTI 404 (e.g., about 1 ms) and may be the basic unit for scheduling. A subband 406 may comprise a plurality of consecutive RBs 402. For example, a subband 406 may comprise between about two to about eight RBs 402. Without loss of generality, the scheduling granularity may be in terms of subbands. For example, at each TTI, the scheduling resource unit for the UEs may be a subband reserved during a TTI. In an embodiment, a frequency channel may have a channel bandwidth 408 of about 10 megahertz (MHz) and may comprise about 50 RBs 402 and about 600 OFDM subcarriers 410 in each 1 ms TTI 404.

Utility-based scheduling may be a non-deterministic polynomial-time (NP)-hard problem. The NP-hardness of utility-based scheduling may be shown by applying a polynomial-time reduction from the NP-complete problem called weighted k-set packing problem to the special case of utility-based scheduling. Set packing is a classical NP-complete problem in computational complexity theory and combinatorics, where given a finite set V and a collection C of the subsets V, the maximum set packing problem is to find the sub-collection C' out of C, such that for any A, B ∈ C', A∩B=Ø, and the cardinality of C' is the maximum. In the weighted version of the problem, each set in C has a positive weight and the objective is to maximize the total weight of the sets in the set packing. The maximum weighted k-set packing problem is a restricted variant of the maximum weighted set packing problem where the size of every set in C is bounded from above by a constant $k^2$. For utility-based scheduling, the case may be considered where $\lambda_{k,s}>0$ for all $k \in K$ and all $s \in S$, and $|K| \geq L \times |S|$, which may ensure each weight of priority is positive and the total number of UEs is larger than the number of possible served users on all subbands. In such a case, the elements of the set V are the UEs and the available subbands. The collection C of subsets of V includes all the subsets made up of any L or less non-conflicting UEs and a subband. The size of each subset C may be bounded by L+1. The weight of a subset A and C is defined as the aggregate weight of priority of those UEs on the corresponding subband (e.g., $W_A = \Sigma_{k,s \in A} \lambda_{k,s}$). If any two subsets in C do not share common UEs and subband, they may be considered disjoint from each other. As such, utility-based scheduling may find a group of disjoint sets in C with the largest possible aggregate weight, where the size of each set in C is bounded by L+1. Since each set in C is with positive weight, a solution may cover all subbands which may be equivalent to the maximum weighted k-set packing problem, and therefore utility-based scheduling may be an NP-hard problem.

The approximation ratio of the utility-based scheduling policy may be no less than $1/z$, where z is the maximum number of times that a UE ranks top-L maximum weight of priority with respect to all subbands. Let V be the resulting aggregate weight of priority from a utility-based scheduling policy and V* denotes the solution to the utility-based scheduling. In the first step of the utility-based scheduling policy, the subband assignment constraint may be relaxed to choose a set of UEs (e.g., $K_s$ and $|K_s|=L$) with the possible largest aggregate weight of priority for each subband. A UE may occupy multiple subbands at the same time, which may provide an upper bound for the optimum V* and may result in the following:

$$\Sigma_{s \in S} \max(\Sigma_{k \in K_s} \lambda_{k,s}) \geq V^*. \quad (18)$$

Assume $S_k^1$ to be the set of subbands that UE k is assigned to during the assignment phase of the first round. If $|S_k^1|=0$, then UE k may not be selected for service in the first assignment phase, however, this does not imply that UE k will not be ultimately chosen to be served in the final assignment. If $|S_k^1|=1$, then UE k may be assigned to a single subband and no further effort may be needed in this particular assignment round. Otherwise, when $|S_k^1|>1$, then UE k may be assigned to multiple subbands and a conflict resolution may need to be performed. In the first assignment round, the subband assignment constraint may be relaxed and all UEs with the status of "undetermined" may be considered. The aggregate weight of priority for each subband in the first assignment round may be the largest compared with subsequent rounds and may be expressed as follows:

$$\Sigma_{s \in S} \max(\Sigma_{k \in K_s} \lambda_{k,s}) = \Sigma_{k \in K} (\Sigma_{s \in S_k^1} \lambda_{k,s}). \quad (19)$$

During each iteration, the assignment conflict resolution may decide the resulting subband for a UE appearing on multiple subbands by comparing the weight of priority across all subbands. Assume $s_m^i$ to be the subband with the maximum weight of priority for a particular UE k in the iteration i (e.g., $s_m^i = \arg\max_{s \in S_k} \lambda_{k,s}$), which may be favored by the UE to stay on and to refrain from keeping on other subbands. The UE may appear on a single subband may be $S_k^i = \{s_m^i\}$. Using the term $K_p^i$ may denote the set of UEs selected for service in each iteration i and the term $K_p^f$ may denote the result in the final iteration, a resulting inequality may be expressed as follows:

$$V^* \leq \sum_{k \in K} \left( \sum_{s \in S_k^1} \lambda_{k,s} \right) = \sum_{k \in K_p^1} \left( \lambda_{k,s_m^1} + \sum_{s \in S_k^1 \setminus \{s_m^1\}} \lambda_{k,s} \right) \leq \sum_{k \in K_p^1} z \cdot \lambda_{k,s_m^1} = \quad (20)$$

$$z \cdot \sum_{k \in K_p} \lambda_{k,s_m^1} \leq z \cdot \sum_{k \in K_p^f} \lambda_{k,s_m^f} = z \cdot V,$$

where z is the maximum number of times that a UE ranks top-L maximum weight of priority with respect to all subbands. The UE may appear on at most z subbands in the first assignment phase. During conflict resolutions, the UEs involved in conflicting assignments may be removed from the unfavored subbands and other UEs may be added to the set to fill assignment vacancies. The number of distinct selected UEs in the set may increase as the iterations continue and may imply that $K_p^1 \subseteq K_p^f$ holds. Moreover, the assignment for a UE may not change once its status becomes "determined" and its resulted weight of priority may be maintained to the end of the algorithm. For example, if the conflicting assignment of a UE k is solved in the first iteration, then its status may become "determined" with a result, $\lambda_{k,s_m^1} = \lambda_{k,s_m^f}$ for UE k. Since $K_p^1 \subseteq K_p^f$ holds and the weight of priority of the determined UEs in the first and all intermediate rounds may not change further with subsequent iterations, the last inequality in Eq. (20) may thus hold.

The time complexity of utility-based scheduling policy may be O $(|S||K|\log|K|+|K||S|^2)$. A DASH over MU-MIMO LTE system may comprise $|K|$ UEs and $|S|$ subbands. Each subband may accommodate L UEs (e.g., UE 108 as described in FIG. 1). Sorting the UEs according to their weight of priority on all subbands may cost O $(|S||K|\log|K|)$ time while sorting the subbands for each UE may cost O $(|K||S|\log|S|)$ time. During each assignment iteration, at least one UE may become "determined." In a worst case, there may be $L|S|$ number of rounds. During each iteration, the assignment phase may take at most O $(L|S||K|)$ time, because there may be at most $L|S|$ vacancies across all subbands for each time and any conflict-free "undeteremined" UEs selected for a vacancy may cost at most O $(|S|)$ time. For each conflict resolution phase, there may be at most $(\frac{1}{2})*L|S|$ UEs appearing on multiple subbands. Each repetitive UE may cost at most O $(|S|)$ time compared to determine its preferred subband having the relatively largest weight of priority base on the sorted result. Therefore, the main two-phase iterations in the algorithm may be O $(L^2|K||S|^2+(\frac{1}{2})*L^2|S|^3)$ time. Since L may be typically a very small integer and $|K|$ may be generally larger than $|S|$, the time cost of the iterations can be expressed as O $(|K||S|^2)$. Therefore, the total time complexity of the priority search algorithm may be O $(|S||K|\log|K|+|K||S|^2)$.

Figure 5:
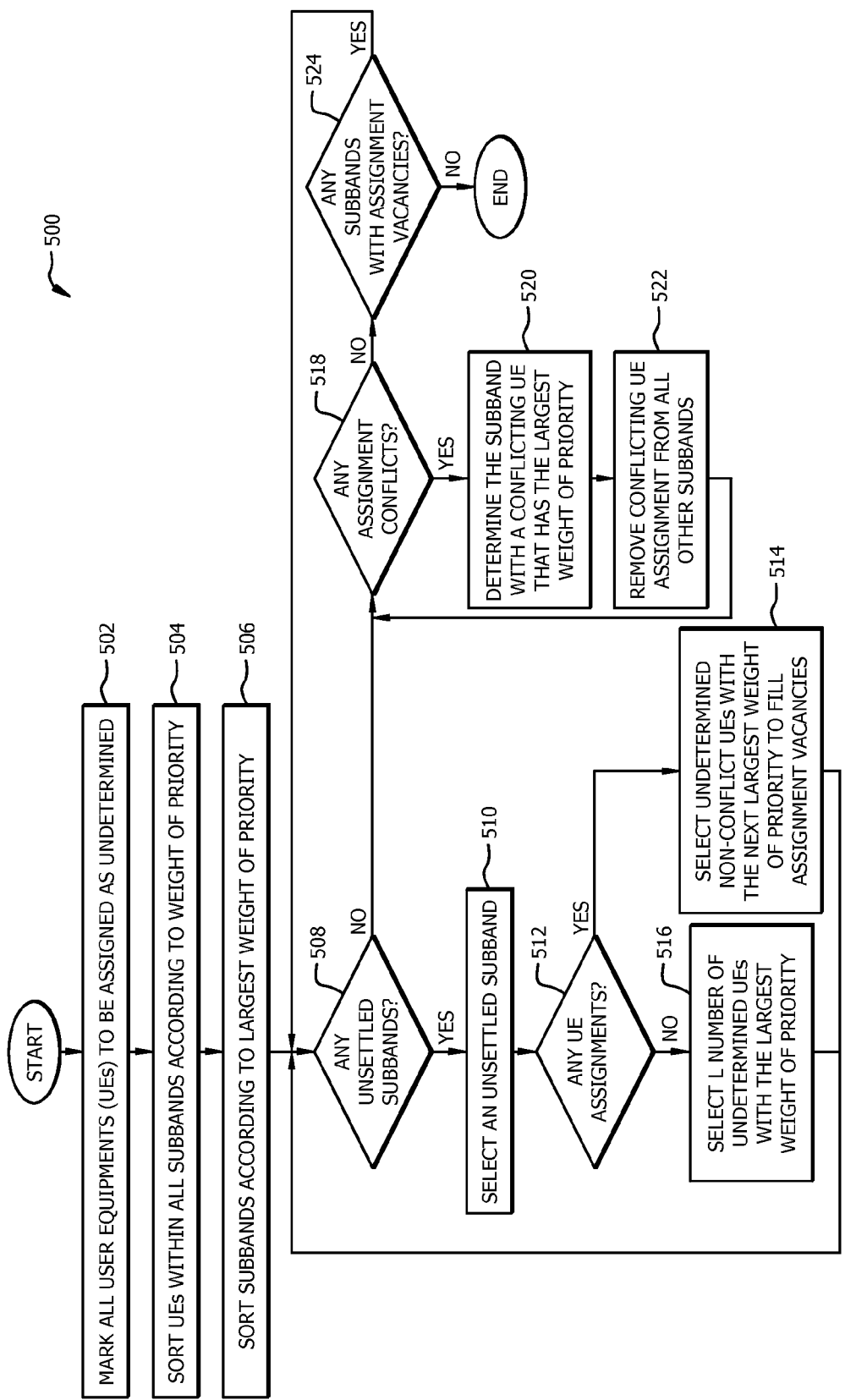
FIG. 5 is a flow chart of an embodiment of a utility-based scheduling method.

FIG. 5 is a flow chart of an embodiment of a utility-based scheduling method 500. Method 500 may employ a utility-based scheduling policy to schedule or assign a predetermined number of UEs (e.g., UE 108 as described in FIG. 1) to subbands such that a maximum aggregate weight of priority (e.g., $\lambda_{k,s}$ as defined by Eq. (14)) across all subbands may be achieved and each UE only appears on a single subband. For example, an eNodeB (e.g., eNode 104 as described in FIG. 1) may employ the method 500 to schedule L number of UEs on each subband for a video service. A video service may generally describe the communication a plurality of media content segments (e.g., DASH media content segments) received from a media content source (e.g., an eNodeB) to one or more UEs. Method 500 may operate iteratively between an assignment phase and a conflict resolution phase to optimize the aggregate weight of priority for the system. In an assignment phase, L number of UEs may be selected for each unsettled subband. Previous UE assignments may be maintained and UEs with an "undetermined" status may be selected to occupy assignment vacancies within a subband. The assignment phase may select UEs that are not in conflict with each other (e.g., each UE has a different PMI selection) for each subband and may select UEs such that the aggregate weight of priority of the selected UEs is the largest for each subband. A conflict resolution phase may resolve assignment conflicts where a UE is simultaneously assigned to multiple subbands. For example, the conflict resolution phase may compare the weight of priority of a UE with an assignment conflict for each subband. The conflict resolution phase may assign the UE to the subband where the weight of priority is largest and may remove the UE assignment from the other subbands. Upon resolving an assignment conflict, the status of the UE may be set to "determined." The assignment phase and/or the conflict resolution phase may be repeated until all subbands are allocated to non-repeated UEs or until there are no assignments available for an unsettled subband.

At step 502, method 500 may mark all UEs to be assigned as "undetermined." Method 500 may generate a set list of UEs to indicate a plurality of UEs to be assigned to one or more subbands. At step 504, method 500 may sort the UEs within each of the subbands according to the weight of priority of the UEs. The UEs may be sorted for all of the subbands. At step 506, method 500 may sort or arrange the subbands according to the subbands that have UEs with the largest weight of priority. At step 508, method 500 may determine if there are any unsettled subbands having one or more UE assignment vacancies. Upon determining one or more subbands are unsettled, method 500 may proceed to step 510; otherwise, method 500 may proceed to step 518.

At step 510, an unsettled subband may be selected to assign one or more UEs to the subband. At step 512, method 500 may determine if the unsettled subband already has one or more UE assignments. If the selected subband has one or more UEs already assigned then method 500 may proceed to step 514; otherwise, method 500 may proceed to step 516. At step 514, method 500 may select one or more undetermined non-conflicting UEs with the next largest weight of priority to fill the one or more assignment vacancies and may return to step 508. Returning to step 512, if there are no assigned UEs the method 500 may proceed to step 516. At step 516, method 500 may select L number of undetermined UEs with the largest weight of priority to be assigned to the subband and may return to step 508.

Returning to step 508, if there are no unsettled subbands, method 500 may proceed to step 518. At step 518, method 500 may determine if there are any assignment conflicts (e.g., a UE has been assigned to more than one subband). If there are any assignment conflicts, method 500 may proceed to step 520; otherwise, method 500 may proceed to step 524. At step 520, method 500 may determine the conflicting subbands and may determine which subband has the conflicting UE with the largest weight of priority. At step 522, method 500 may remove the conflicting UE assignment from all other subbands and may return to step 518. Returning to step 518, if there are no assignment conflicts, method 500 may proceed to step 524. At step 524, method 500 may determine if any subbands have one or more assignment vacancies. If method 500 determines any subbands have one or more assignment vacancies, method 500 may return to step 508; otherwise, method 500 may terminate. Table 2 is an embodiment of pseudocode for utility-based scheduling method 500.

TABLE 2

An embodiment of psuedocode
for utility-based scheduling method 500

Figure 6:
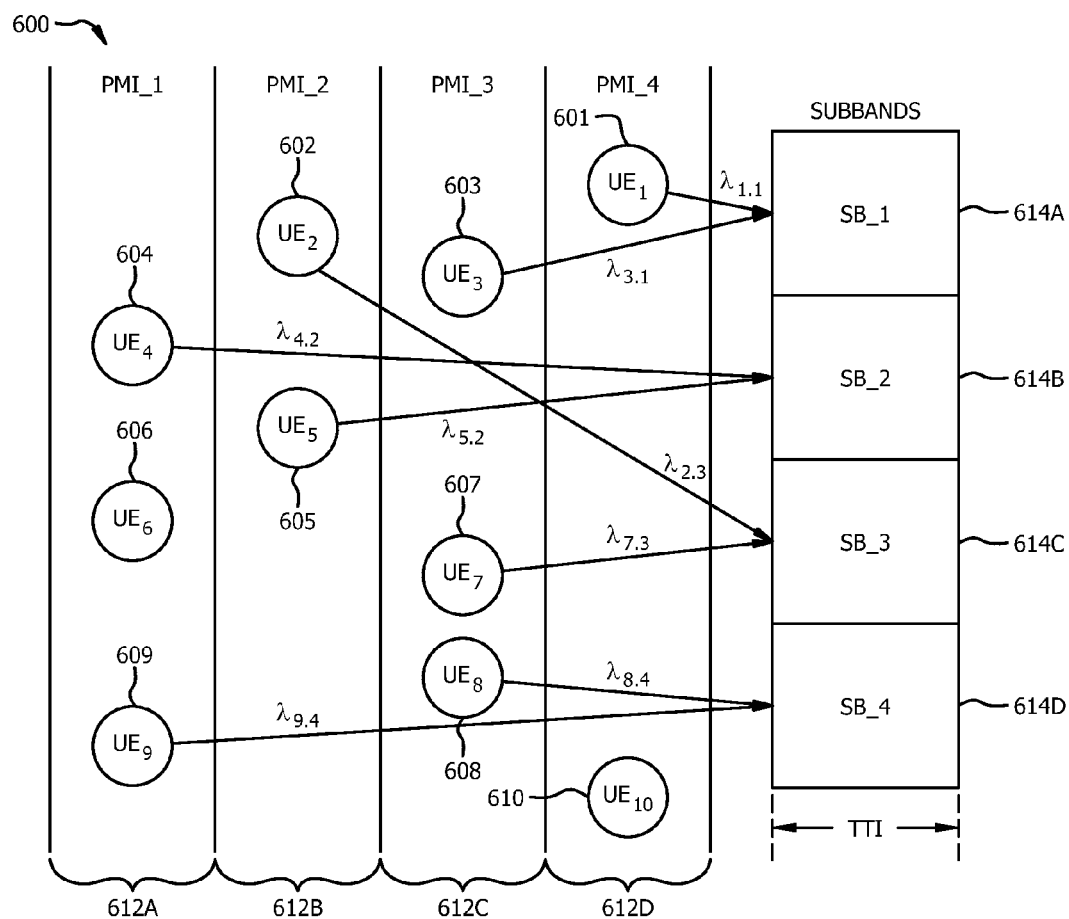
FIG. 6 is a schematic diagram of an embodiment of a utility-based scheduling.

Let U be the unsettled subbands and initialize U = S;
Let X be the set of UEs, which are selected to be on multiple subbands
after each pre-assignment and initialize X = θ;
Let $K_s$ be the set of UEs assigned to subband s after each pre-assignment
and initial $K_s$ = θ for all s ∈ S;
Let $S_k$ be the set of subbands that UE k is assigned to after each pre-assignment and initialize $S_k$ = θ for all k ∈ K;
Initially mark all UEs in K as "undetermined";
for each subband s ∈ S do
    Sort all UEs according to $\lambda_{k,s}$ for all k;
end for
for each UE k ∈ K do
    Sort subbands according to $\lambda_{k,s}$ for all s;
end for
while U ≠ θ do
    // Pre-assignment phase
    for each s ∈ U do
        if subband s does not accommodate any UE do
            Select L undetermined non-conflicting UEs with the
            largest weight of priority for subband s
        else
            Select undetermined non-conflicting UEs from K \ $K_s$
            with the largest weight of priority to fill up the vacancy
            on subband s, which is conflict-free with already-
            existing UEs on the subband
        end if
        Update all $K_s$ 's accordingly;
    end for
    // Conflicting assignment resolution phase
    Check the pre-assignment across all subbands and put the UEs
    appearing on multiple subbands to the set X;
    Update all $S_k$'s accordingly;
    if X ≠ θ do
        for each k ∈ X
            $s_m \leftarrow \arg\max_{s \in S_k} \lambda_{k,s}$;
            Keep UE k on subband $s_m$, and remove it from all other
            subbands in $S_k \setminus \{s_m\}$;
            Update $K_s$ for all s ∈ $S_k \setminus \{s_m\}$ accordingly;
            $S_k \leftarrow s_m$;
            Mark UE k as "determined";
        end for
    end if
    Clear X and update U with the subbands that there exist vacancy;
end while FIG. 6 is a schematic diagram of an embodiment of utility-based scheduling 600. In an embodiment, for each TTI, utility-based scheduling 600 may employ a utility-based scheduler (e.g., utility-based scheduler 114 as described in FIG. 1) and a scheduling method (e.g., utility-based scheduling method 500 as described in FIG. 5) to schedule a plurality of UEs 601-610 within a plurality of PMIs 612A-612D to a plurality of subbands 614A-614D. The utility-based scheduling 600 may be performed by a utility-based scheduler (e.g., utility-based scheduler 114 as described in FIG. 1). In FIG. 6, each PMI may be represented by a column and the presence of a UE within a column indicates the PMI selected by the UE. Each UE may be configured to select a PMI based on the channel state of the UE. For example, UEs 604, 606, and 609 may select PMI 612A, UEs 602 and 605 may select PMI 612B, UEs 603, 607, and 608 may select PMI 612C, and UEs 601 and 610 may select PMI 612D. In FIG. 6, each subband may be configured to support only two UEs. Based on the subband CQIs, each UE may have a weight of priority (e.g., $\lambda_{k,s}$ as defined by Eq. (14)) with respect to each of the subbands. Using spatial reuse, non-conflicting UEs (e.g., UEs having different PMI selections) may be assigned to share subbands. An assignment of a UE to a subband may be indicated by a line with an arrow. For example, UEs 601 and 603 may be assigned to subband 614A, UEs 602 and 605 may be assigned to subband 614B, UEs 602 and 607 may be assigned to subband 614C, and UEs 608 and 609 may be assigned to subband 614D. Additionally, UEs 606 and 610 may not be assigned to a subband during the current TTI.

Figure 7:
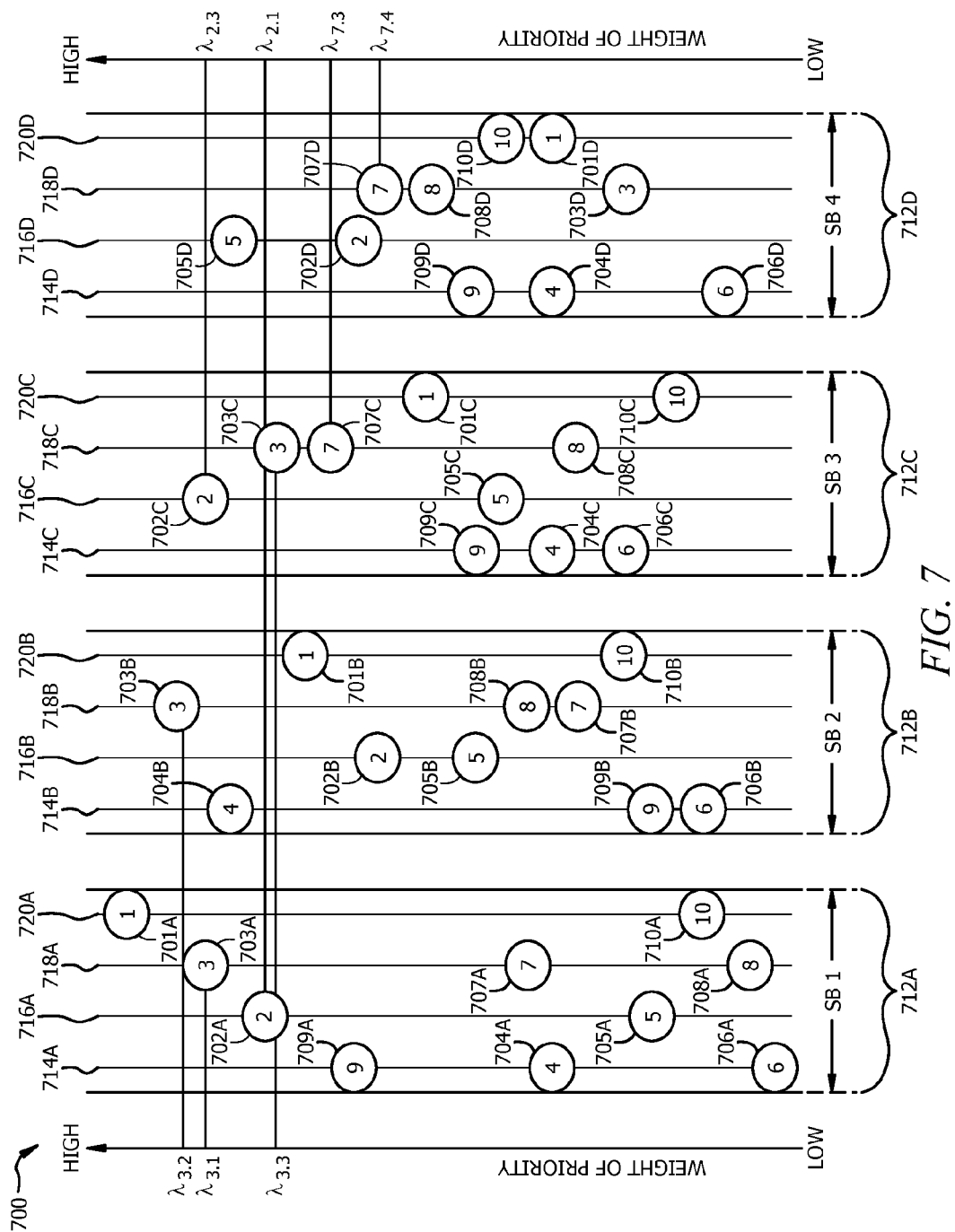
FIG. 7 is a schematic diagram of another embodiment of a utility-based scheduling.

FIG. 7 is a schematic diagram of another embodiment of utility-based scheduling 700. Utility-based scheduling 700 may employ a utility-based scheduler (e.g., utility-based scheduler 114 as described in FIG. 1) and a scheduling method (e.g., utility-based scheduling method 500 as described in FIG. 5) to assign a plurality of UEs 701-710 to a plurality of subbands 712A-712D. Each UE 701-710 may be referenced with respect to each subband 712A-712D, for example, UE 701 may be referred to as UE 701A with respect to subband 712A, UE 701B with respect to subband 712B, UE 701C with respect to subband 712C, and UE 701D with respect to subband 712D. Each subband 712A-712D comprises a plurality of PMIs. For example, subband 712A comprises PMIs 714A-720A, subband 712B comprises PMIs 714B-720B, subband 712C comprises PMIs 714C-720C, and subband 712D comprises PMIs 714D-720D. In FIG. 7, each PMI is shown as a column within its corresponding subband. A PMI selection by a UE may be determined by feedback from a UE and may be indicated by the presence of a UE within the column of the PMI. The weight of priority (e.g., $\lambda_{k,s}$ as defined by Eq. (14)) for a UE with respect to other UEs within the same PMI may be indicated by the vertical position of the UE. For example, in PMI 714A of subband 712A, UE 709A has a greater weight of priority than UE 704A.

Using CQI feedback from the UEs 701-710 with respect to each subband 712A-712D, the utility-based scheduler may determine the weight of priority for each of the UEs 701-710 with respect to each of the subbands 712A-712D. The utility-based scheduler may set the status of the UEs 701-710 to "undetermined" and may be sorted by weight of priority for each subband 712A-712D. Additionally, the subbands 712A-712D may be sorted according to the subbands having UEs with the largest weight of priority. The utility-based scheduler may be configured to co-schedule L number of UEs per subband. For example, L may be equal to two and the utility-based scheduler may select two UEs that are not in conflict with each other (e.g., each UE has a different PMI selection) on each subband and that results in the largest aggregate weight of priority across all subbands. Table 3 is an assignment summary for utility-based scheduling 700.

TABLE 3

Assignment summary for utility-based scheduling 700

| First Assignment Iteration: | (1,3), (3,4), (2,3), (5,7) | |
|---|---|---|
| Conflict Resolution: | (1,?), (3,4), (2,?), (5,7) | $\lambda_{3,2} > \lambda_{3,1} > \lambda_{3,3}$ |
| Second Assignment Iteration: | (1,2), (3,4), (2,7), (5,7) | $\lambda_{2,3} > \lambda_{2,1}$ |
| Conflict Resolution: | (1,?), (3,4), (2,7), (5,?) | $\lambda_{7,3} > \lambda_{7,4}$ |
| Third Assignment Iteration: | (1,9), (3,4), (2,7), (5,8) | |

In a first assignment iteration, the UEs 701-710 may have an undetermined status and the subbands 712A-712D may be unsettled. The utility-based scheduler may assign UEs 701A and 703A to subband 712A, UEs 703B and 704B to subband 712B, UEs 702C and 704C to subband 712C, and UEs 705D and 702D to subband 712D. In subband 712D, UEs 705D and 702D have the same PMI and conflict with each other. When a subband has conflicting UEs, a utility-based scheduler may replace the UE with the lower weight of priority in the assignment with a UE having the next largest weight of priority. For example, in subband 712D, the utility-based scheduler may replace UE 702D with UE 707D. To resolve when a UE appears on multiple subbands after the assignment, the utility-based scheduler may check for assignment conflicts and may determine an assignment conflict with UE 703A on subband 712A, UE 703B on subband 712B, and UE 703C on subband 712C. The utility-based scheduler may perform conflict resolution for the assignment conflicts. For example, the utility-based scheduler may compare the weight of priority for UE 703A, 703B, and 703C and may determine that UE 703B has the largest weight of priority. The assignment of UE 703B on subband 712B may be preserved and the status of UE 703 may be changed to "determined". The assignments of UE 703A on subband 712A and UE 703C on subband 712C may be removed. The utility-based scheduler may determine that subbands 712A and 712C have assignment vacancies.

In a second assignment iteration, the utility-based scheduler may fill in assignment vacancies by selecting the next non-conflicting UEs with the largest weight of priority for each subband, for example, UE 702A on subband 712A and UE 707C on subband 712C. The utility-based scheduler may determine assignment conflicts between UE 702A on subband 712A and UE 702C on subband 712C and between UE 707C on subband 712C and UE 707D on subband 712D. The utility-based scheduler may perform conflict resolution and may compare the weight of priority of the UEs with assignment conflicts. The utility-based scheduler may preserve the assignments of UE 702C and UE 707C on subband 712C and may change the status of UE 702C and UE 707C to "determined". The assignments of UE 702A on subband 712A and UE 707D on subband 712D may be removed. The utility-based scheduler may determine that subbands 712A and 712D have assignment vacancies. In a third assignment iteration, the utility-based scheduler may assign UE 709A to subband 712A and UE 708D to subband 712D. The utility-based scheduler may determine there are no assignment conflicts. For example, UEs 701A and 709A may be assigned to subband 712A, UEs 703B and 704B may be assigned to subband 712B, UEs 702C and 707C may be assigned to subband 712C, and UEs 705D and 708D may be assigned to subband 712D. As such, the utility-based scheduler may determine that subbands 712A-712D are settled and utility-based scheduling 700 terminates.

Figure 8:
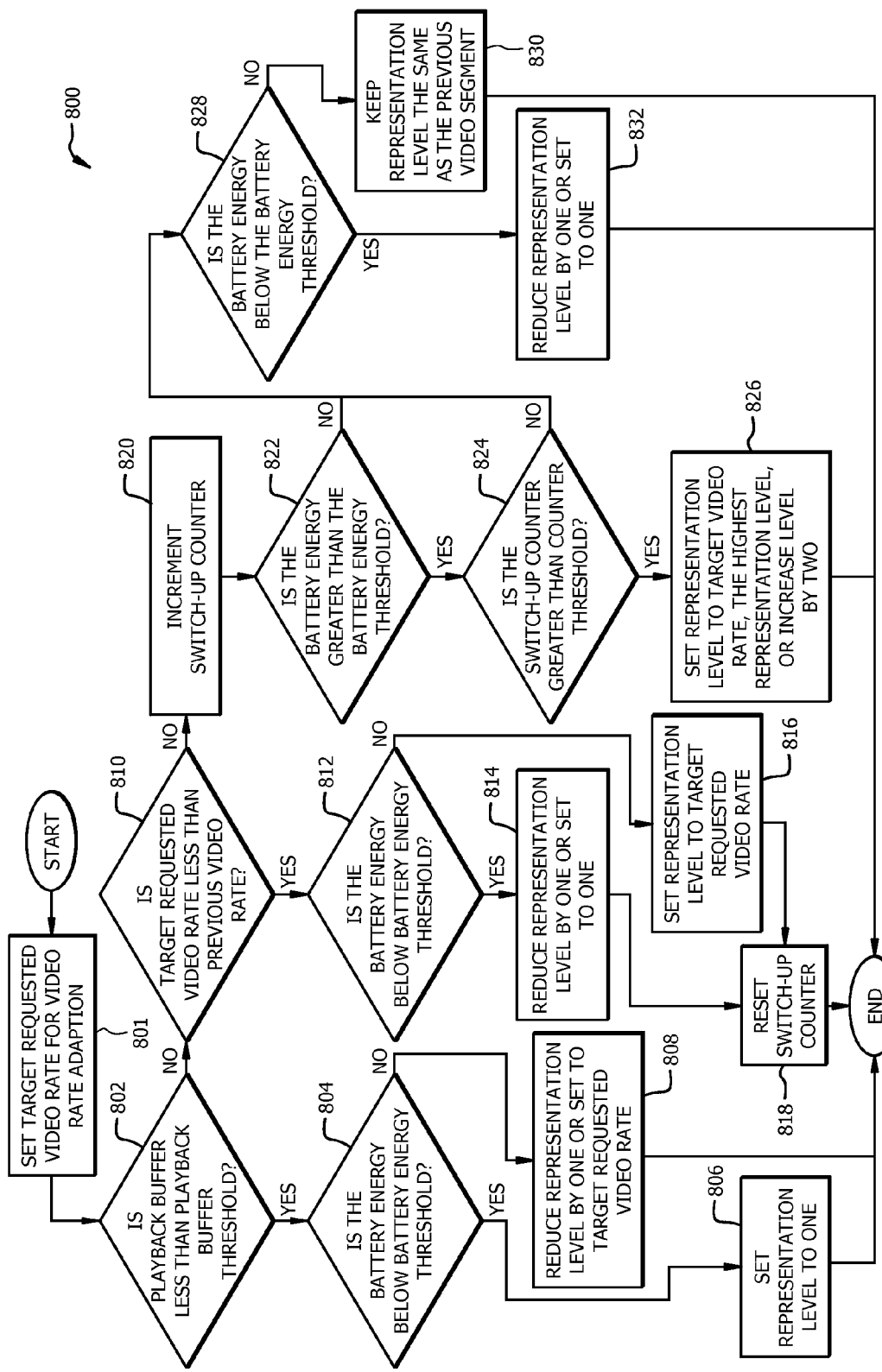
FIG. 8 is a flow chart of an embodiment of a video rate adaptation method.

FIG. 8 is a flow chart of an embodiment of a video rate adaptation method 800. Method 800 may be an application-layer video rate adaptation and may dynamically request video segments encoded in different bit rates based on various parameters, such as, channel rate (e.g., video rate), the playback buffer status of a UE and the battery energy of the UE. For example, method 800 may be implemented by a UE (e.g., UE 108 as described in FIG. 1) to request video segments from an eNodeB (e.g., eNodeB 104 as described in FIG. 1) and may allow the UE to dynamically request video segments encoded in different bit rates based on channel conditions, preferences of the UE, and/or capabilities of the UE. Method 800 may smoothly increase the requested video rate as the available network resources increase under allowable playback buffer and battery energy conditions and may reduce the video rate in response to channel degradation, buffer emptying, and/or energy depletion.

At step 801, method 800 may set a target requested video rate for video rate adaption. In an embodiment, an additional target playback buffer threshold, which may be different from and/or higher than the playback buffer $q_t$, may be set to classify the mode of operation for a UE as being in a buffering mode or a steady-state mode. In a buffering mode, the playback buffer size may be less than the target playback buffer threshold. In order to provide a timely frame accumulation, a UE may request a new video segment as soon as the previous video segment downloads. In the buffering mode, the target requested video rate $\tilde{v}_k(n)$ for a UE k requesting for segment n may be expressed as follows:

$$\tilde{v}_k(n) = \rho \bar{r}_k + (1-\rho)\frac{1}{|S|}\sum_s r_{k,s}, \quad (21)$$

where $\bar{r}_k$ is the average achieved video rate just before downloading segment n and $\rho$ is a parameter to adjust the impact of historical data rate and the estimated instantaneous physically-supportable data rate. Such an expression may provide a consistent video rate and may avoid unnecessary video rate and/or representation level shifting.

In a steady-state mode, the playback buffer size may be greater than or equal to the target playback buffer threshold. While operating in a steady-state mode, a UE may periodically fetch a new video segment after some interval of time (e.g., about two seconds). Periodic fetching of video segments may allow a UE to maintain the size of the playback buffer at a certain level while saving network resources for other UEs. In the steady-state mode, the target requested video rate may be expressed as follows:

$$\tilde{v}_k(n) = \rho \bar{r}_{k,sg} + (1-\rho)\frac{1}{|S|}\sum_s r_{k,s}, \quad (22)$$

where, $r_{k,sg}$ is the preceding segment throughput. A finite number of discrete video rate representations may be available. For example, the actual requested video representation level for segment n may be the highest level with the video rate less than $\tilde{v}_k(n)$, which may be expressed as:

$$l_k(n) = Q_v(\tilde{v}_k(n)), \quad (23)$$

where $Q_v(\cdot)$ represents a quantization function that may convert the input rate to a discrete video representation quality level $l_k$. Method 800 may consider the condition of the playback buffer and the battery energy when adjusting the representation level, which may lead to improved performance with less playback buffer depletion and/or more energy savings at the UEs. To further dampen frequent fluctuations caused by adjustments due to channel dynamics, method 800 may employ a switch-up counter which may be a parameter m that controls a balance between responsiveness and smoothness of the video rate adaptation. The switch-up counter may be set as a constant or dynamically adjusted according to performance. To reduce the frequency of small timescale fluctuations, method 800 may only switch-up the requested representation level when the target video rate is consistently larger than the immediate preceding video rate for a sufficient long period of time. A sufficiently long period of time may be determined by comparing the switch-up counter to a counter threshold. A sufficiently long period of time may be indicated when the switch-up counter is greater than the counter threshold.

At step 802, method 800 may determine if the playback buffer is less than the playback buffer threshold. If the playback buffer drops below the playback buffer threshold, it may indicate that method 800 may be in danger of a playback freeze due to the buffer starving. If the playback buffer is less than the playback buffer threshold, then the method 800 may proceed to step 804; otherwise, method 800 may proceed to step 810. At step 804, method 800 may determine if the battery energy is below the battery energy threshold. If the battery energy is below the batter energy threshold, then method 800 may proceed to step 806; otherwise, method 800 may proceed to step 808. At step 806, method 800 may set the representation level to one and method 800 may terminate.

Returning to step 804, if the battery energy is above the battery energy threshold, method 800 may proceed to step 808. At step 808, method 800 may reduce the representation level by one quality level or may set the representation level according to the target video rate. For example, the target video rate may be subject to a minimum supported bit rate such as $l_k(n) = \max\{1, \min\{l_k(n-1)-1, Q_v(\tilde{v}_k(n))\}\}$, where $l_k(n-1)$ is the representation level of the preceding segment. Following setting the representation level method 800 may terminate.

Returning to step 802, if the playback buffer is greater than the playback buffer threshold, method 800 may proceed to step 810. For example, if the playback buffer sufficiently accommodates video segments, then method 800 may indicate that the current fetched level may be maintained or switched to a higher level. At step 810, method 800 may determine if the target requested video rate is less than the previous video rate. If the target requested video rate is less than the previous video rate, then method 800 may proceed to step 812; otherwise, method 800 may proceed to step 820. At step 812, method 800 may determine if the battery energy is below the battery energy threshold. If the battery energy is below the battery energy threshold, then method 800 may proceed to step 814; otherwise, method 800 may proceed to step 816. At step 814, method 800 may reduce the representation level by one quality level from the quantized level of the derived target video rate or may set the representation level to one. Following setting the representation level, method 800 may proceed to step 818. At step 818, method 800 may reset the switch-up counter and method 800 may terminate. For example, when $\tilde{v}_k(n) < v_k(n-1)$ method 800 may reset the switch-up counter. Returning to step 812, if the battery energy is above the battery energy threshold, then method 800 may proceed to step 816. At step 816, method 800 may set the representation level to the target requested video rate and may proceed to step 818 to reset the switch-up counter and terminate.

Returning to step 810, if the target requested video rate is not less than the previous video rate, then method 800 may proceed to step 820. At step 820, method 800 may increment the switch-up counter and proceed to step 822. At step 822, method 800 may determine if the battery energy is greater than the battery energy threshold. If the battery energy is greater than the battery energy threshold, then method 800 may proceed to step 824; otherwise, method 800 may proceed to step 828. At step 824, method 800 may determine if the switch-up counter is greater than the counter threshold. If the switch-up counter is greater than the counter threshold, then method 800 may proceed to step 826; otherwise, method 800 may proceed to step 828. At step 826, method 800 may set the representation level to the target video rate, the highest representation level, or may increase the representation level by two quality levels and may terminate. For example, at step 826 the fetched representation level may be considered as enhanced since both the channel and the UE are in good condition and the representation level may be increased conservatively to avoid incoherency and/or non-smoothness due to sharp video rate increases.

Returning to steps 822 and 824, if the battery energy is less than the battery energy threshold or the switch-up counter is less than the counter threshold, then method 800 may proceed to step 828. At step 828, method 800 may determine if the battery energy is less than the battery energy threshold. If the battery energy is less than the battery energy threshold, then method 800 may proceed to step 832; otherwise, method 800 may proceed to step 830. At step 832, method 800 may reduce the representation level by one quality level or may set the representation level to one. For example, method 800 may reduce the representation level to improve energy efficiency. Following setting the representation level method 800 may terminate. Returning to step 828, if the battery energy is not less than the battery energy threshold, then method 800 may proceed to step 830. At step 830, method 800 may keep the representation level the same as the previous video segment and may terminate.

Table 4 is an embodiment of pseudocode for video rate adaptation method 800.

TABLE 4

Figure 9:
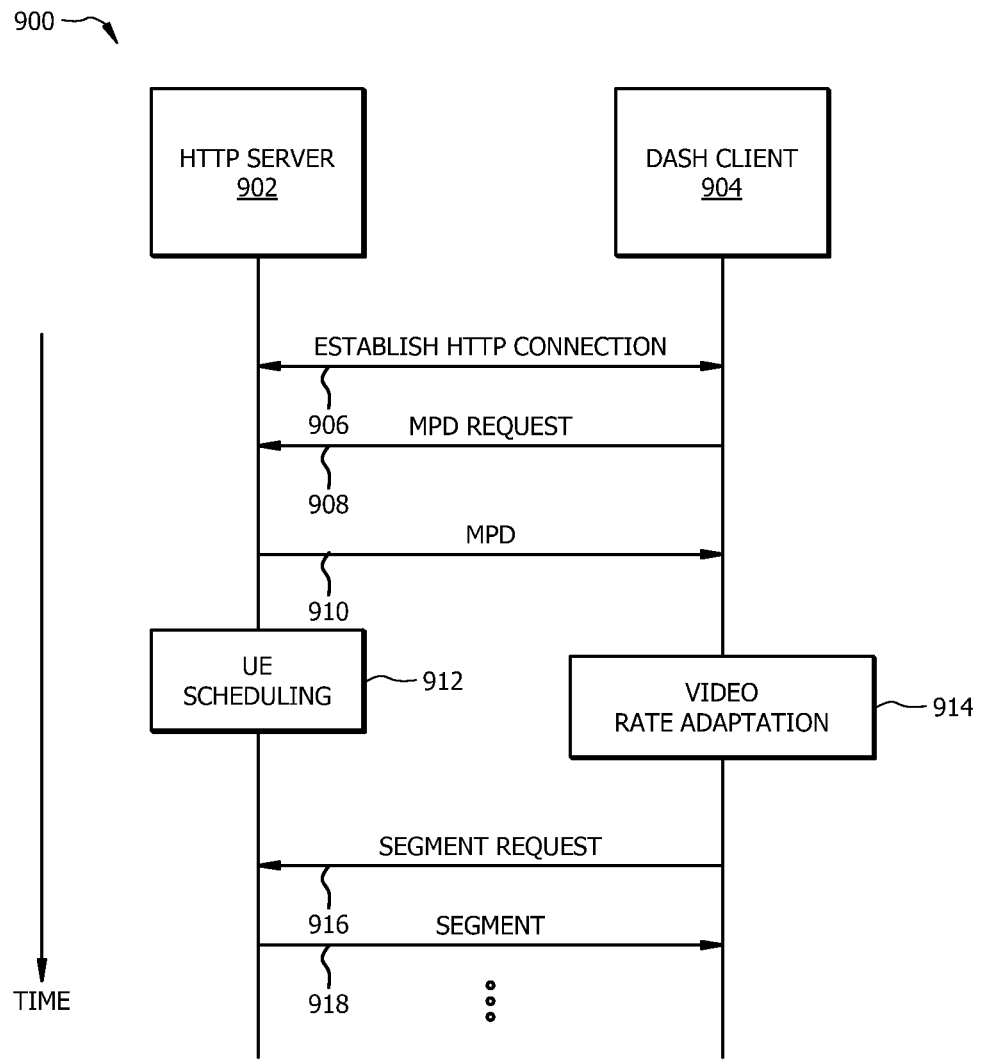
FIG. 9 is a protocol diagram of an embodiment of a utility-based DASH method.

An embodiment of psuedocode for video rate adaptation method 800 if in buffering mode then $\tilde{v}_k(n) = \rho \bar{r}_k + (1 - \rho) \frac{1}{|S|} \sum_s r_{k,s}$;

else $\tilde{v}_k(n) = \rho \bar{r}_{k,sg} + (1 - \rho) \frac{1}{|S|} \sum_s r_{k,s}$;

end if
if $q_k(n) < q_T$ then
  if $b_k(n) < b_T$ then $l_k(n) = 1$;
  else $l_k(n) = \max\{1, \min\{l_k(n - 1) - Q_v(\tilde{v}_k(n))\}\}$;
  end if
else
  if $\tilde{v}_k(n) < v_k(n - 1)$ then
    $l_k(n) = b_k(n) < b_T$? $\max\{Q_v(\tilde{v}_k(n)) - 1, 1\} : Q_v(\tilde{v}_k(n))$;
    inc_stable_ct = 0;
  else
    inc_stable_ct++;
    if $b_k(n) > b_T$ and inc_stable_ct > m then
      $l_k(n) = \min\{Q_v(\tilde{v}_k(n)), \min\{l_k(n - 1) + 2, l_{max}\}\}$;
    else
      $l_k(n) = b_k(n) < b_T$? $\max\{l_k(n - 1) - 1, 1\} : l_k(n - 1)$;
    end if
  end if
end if FIG. 9 is a protocol diagram of an embodiment of a utility-based DASH method 900. In an embodiment, an HTTP server 902 may communicate media content to a DASH client 904. For example, an HTTP server 902 may be implemented in an eNodeB (e.g., eNodeB 104 as described in FIG. 1) and a DASH client 904 may be implemented in a UE (e.g., a UE 108 as described in FIG. 1). The HTTP server 902 may receive media content from a content source (e.g., content source 102 as described in FIG. 1) and/or may generate media content. For example, the HTTP server 902 may store media content in memory and/or a cache. At step 906, the HTTP server 902 may establish a data connection with the DASH client 904, such as, an HTTP connection. Specifically, the HTTP server 902 and the DASH client 904 may implement an HTTP protocol to establish a data connection between the HTTP server 902 and the DASH client 904.

At step 908, the DASH client 904 may request an MPD by sending (e.g., transmitting) an MPD request to the HTTP server 902. The MPD request may comprise instructions for downloading or receiving segments of media content from the HTTP server 902. At step 910, the HTTP server 902 may send an MPD to the DASH client 904. An MPD is described in more detail in the ISO/IEC document 23009-1. The DASH client 904 may receive the MPD from the HTTP server 902 via the DAE (e.g., DAE 118 as described in FIG. 1), and the DAE may process the MPD in order to construct and/or issue requests from the HTTP server 902 for media content segments. A media segment is described in more detail in the ISO/IEC document 23009-1. At step 912, the HTTP server 902 may schedule one or more DASH clients 904 for the next TTI by implementing a utility-based scheduling method (e.g., method 500 as described in FIG. 5) to schedule the DASH client 904.

At step 914, the DASH client 904 may perform a video rate adaptation method (e.g., method 800 as described in FIG. 8) to determine a suitable representation level and/or video rate for a media content segment request. At step 916, the DASH client 904 may request a media content segment from the HTTP server 902 based on the determination from the video rate adaptation method. For instance, as instructed by the MPD, the DASH client 904 may send a segment request for media content to the HTTP server 902 via the DAE. At step 918, in response to receiving the segment request, the HTTP server 902 may send the desired media content segment to the DASH client 904. The HTTP server 902 continue to schedule the DASH client 904 and the DASH client 904 may continue to perform the video rate adaptation method and to request media content segments, similar to as previously discussed with respect to steps 912-918.

In one embodiment, a DASH over MU-MIMO LTE system (e.g., DASH over MU-MIMO LTE system 100) may be a MIMO-OFDM LTE air-interface system. The DASH over MU-MIMO LTE system may have a fixed bandwidth of about 10 MHz comprising 50 RBs. Each RB may comprise 12 subcarriers for a total of 180 kilohertz (KHz). A channel trace may be generated for suburban macrocell environment comprising an inner site distance of 1000 meters. The macro cell may comprise 40-60 UEs (e.g., UEs 108 as described in FIG. 1) uniformly distributed within the macrocell. Each UE may comprise six multipaths with a channel gain ranging from about −3 decibels (dB) to −18 dB and a delay spread may range from about 0.3 microseconds (us) to 2.4 us. Each subband may comprise five consecutive RBs and may be scheduled at the beginning of each TTI. The DASH over MU-MIMO LTE system may employ a 2×2 precoding-based MU-MIMO with four codewords. Each UE may transmit a wideband PMI and subband CQI to the eNodeB (e.g., eNodeB 104 as described in FIG. 1) over a PUCCH about every five milliseconds (ms). Table 5 may summarize a list of simulation parameters for the DASH over MU-MIMO LTE system environment.

TABLE 5

An embodiment of simulation parameters for a DASH over MU-MIMO LTE system environment

| Parameters | Values or Settings |
|---|---|
| Channel Fading Model | 3 GPP Spatial Channel Model suburban macrocell |
| MU-MIMO Mode | 2 * 2 MU-MIMO |
| Scheduling granularity | 5-RB subband |
| Multipath gains | 6 paths (−3 db~−18 db) |
| DL transmit power | 46 dbm |
| RB bandwidth | 180 kHz |
| Tx/Rx antenna gains | eNodeB: 18 dbi, UE: 0dbi |
| Thermal noise density | −174 dbm/Hz |
| Noise figure at UE | 7 db |
| Path loss | PL = 46.3 + 33.9 $\log_{10}$ (carrierFreq) − 13.82 $\log_{10}$(eNodeBheight) − (3.2 × $\log_{10}$(11.75 * UEheight)$^2$ − 4.97) + (44.9 − 6.55 × $\log_{10}$(eNodeBheight)) × $\log_{10}$(d) + 3 |
| UE distribution | Uniformly dropped over LTE cell |
| PMI/CQI feeback period | every 5ms |
| Multipath delay spread | 6 paths (0.5 μs~2.5 μs) |
| Inter site distance | 1000 m |

TABLE 5-continued

An embodiment of simulation parameters for a DASH over MU-MIMO LTE system environment

| Parameters | Values or Settings |
| --- | --- |
| Channel bandwidth | 10 MHz (600 subcarriers, 50 RBs, 10 subbands) |
| Scheduling period | TTI (1 ms) |
| DL Tx RBs | 75% of all RBs, others for reference signals and UL transmissions |
| UE speed | 3 km/h |

In an embodiment, the DASH over MU-MIMO LTE system may generate video frames using X.264 and may encode a video stream into an H.264/MPEG-4 advanced video coding (AVC) format. The DASH over MU-MIMO LTE system may provide about 10 representation quality levels. For example, the encoding bit rates for the representation levels may range from about 64 kilobits-per-second (kbps) to about 2 megabits-per-second (Mbps). The resolution set of the representation levels may comprise: 1920×1080, 1280×720, 640×480, and 352×288 for high to low encoding bit rates. The DASH over MU-MIMO LTE system may monitor and/or record a plurality of parameters. For example, the DASH over MU-MIMO LTE system may monitor and/or record frame identifiers (IDs), frame type, frame size, quantization parameters, and peak signal-to-noise ratio (PSNR). A video rate adaption scheme with a switch-up counter threshold set to two (e.g., method 800 as described in FIG. 8) may be performed about every two seconds (s). Energy consumption parameters may be similar to the data values used in "A close examination of performance and power characteristics of 4G LTE networks," by J. Huang, et al. published in MobiSys on June 2012. Table 6 may summarize a list of simulation parameters for the DASH over MU-MIMO LTE system.

TABLE 6

An embodiment of simulation parameters for a DASH over MU-MIMO LTE system

| Parameters | Values |
| --- | --- |
| Number of active UEs in cell | 40-60 |
| Simulation session duration | 30,000 TTIs (ms) |
| Minimum playback buffer size $q_T$ | 240 frames |
| Minimum battery $b_T$ | 20% of full battery capacity |
| Battery capacity | 1000 mAh |
| Initial UEs' playback buffer size | randomly hold 100-300 frames |
| Target playback buffer size | 720-960 frames |
| Initial UEs' battery energy | 15%-100% of battery capacity |
| Video frame rate | 24 frames/second |
| Available video representation rates (bps) | 64K, 128K, 240K, 350K, 470K, 630K, 845K, 1024K, 1536K, 2000K |
| Rate adaptation period | every 2 seconds |
| LTE power | $e^d = 52$ mW/Mbps, $\delta = 1500$ mW |
| Switch-up counter threshold m | 2 video segments |
| Coefficient for target request rate | $\rho = 0.9$ |
| Smooth sliding window W | 2 seconds |

Figure 10:
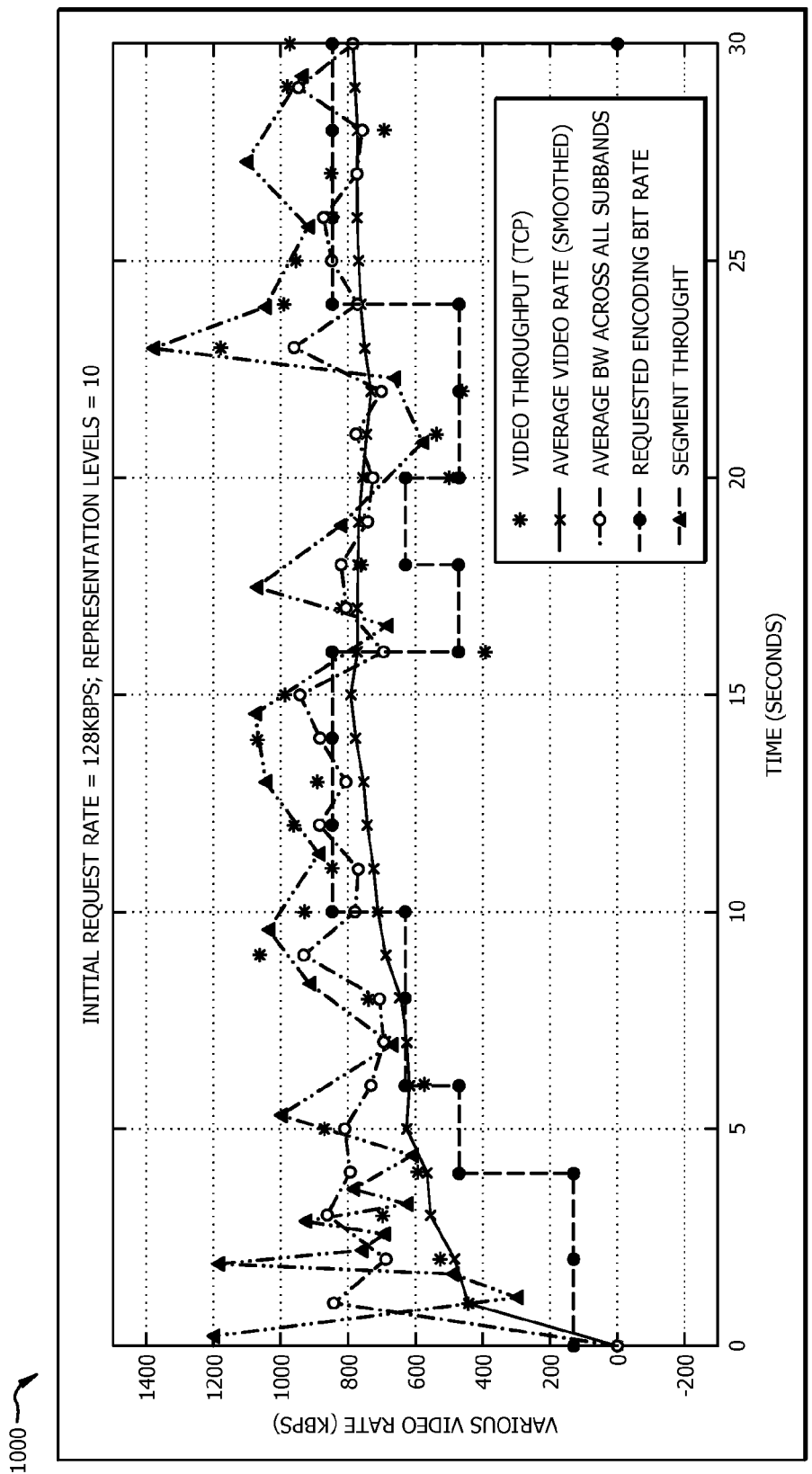
FIG. 10 is an embodiment of a chart of bit rate requests over time for a UE.

FIG. 10 is an embodiment of a chart of bit rate requests over time for a UE 1000. FIG. 10 shows the developing trend of the average bandwidth, average video rate, video throughput, segment throughput, and requested bit rate of a UE. The estimated bandwidth of the UE may be the physically-supportable data rate averaged across all subbands. The average video rate may be the video throughput averaged within a smooth sliding window. The segment throughput may be the short-scale video rate for each segment. Initially the UE begins with an encoding rate of about 128 Kbps and gradually increases to about 845 Kbps. The UE may upshift to the highest possible encoding profile over several transitions, which may reduce the number of large encoding rate changes. When the video throughput drops, the request level may adapt to the degradation. The requested bit rate may be lower than the video throughput. The segment throughput may implicitly show that the encoding rate may adapt in response to channel variations. Initially the UE may request video segments frequently and then may reduce the number of video segment requests. The change in the frequency of video segment requests may be a result of the transmission time increasing for each frame due to the frame size of higher representation levels being larger than that of lower levels. Additionally, when a UE reaches a target buffer size, the UE may enter into a steady-state and may make fewer video segment requests.

Figure 11:
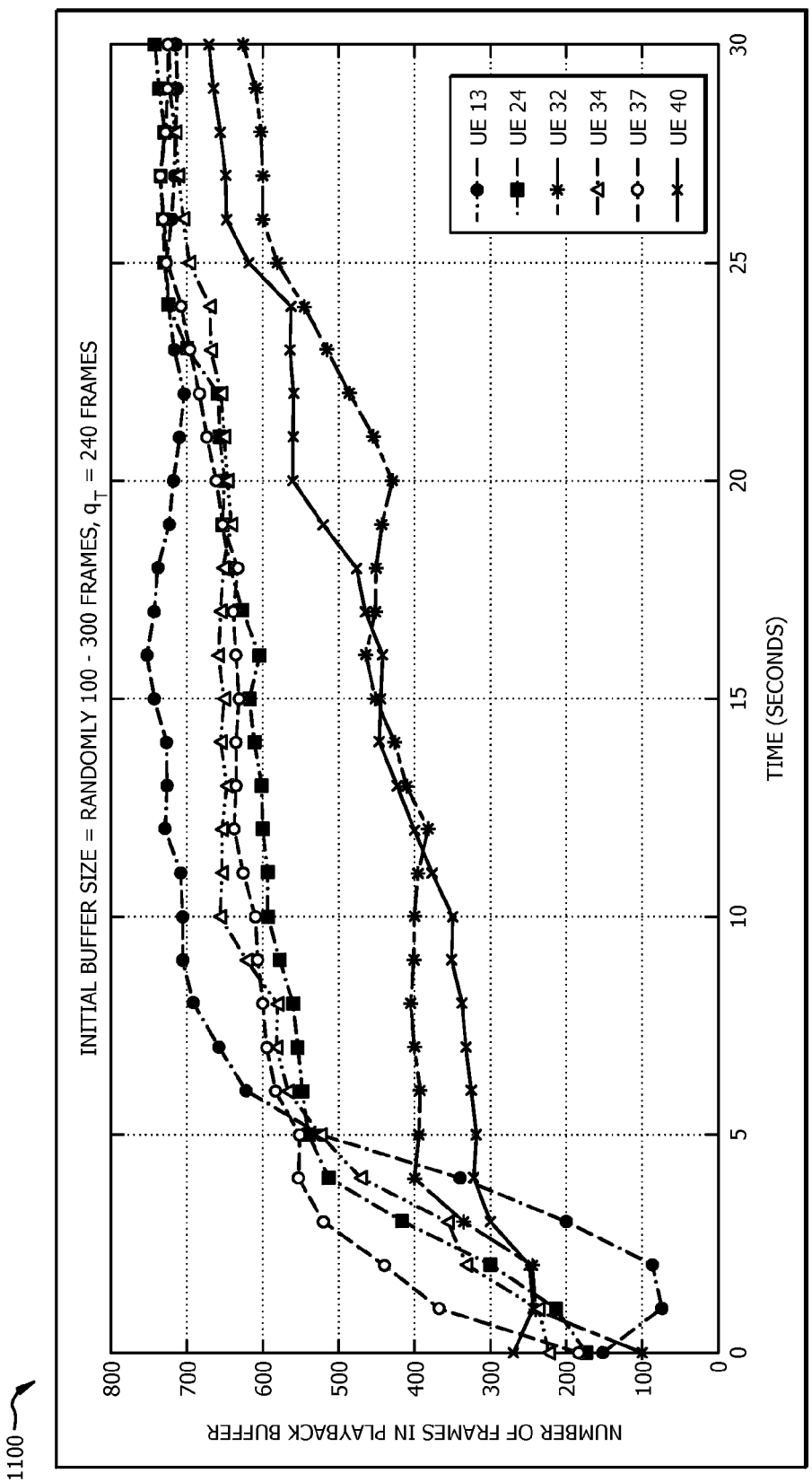
FIG. 11 is an embodiment of a chart of the playback buffer over time for a plurality of UEs.

FIG. 11 is an embodiment of a chart of the playback buffer over time for a plurality of UEs 1100. The initial playback buffer of the UEs may randomly hold about 100 frames to about 300 frames. The number of frames in a playback buffer may gradually accumulate as time elapses. When a requested bit rate is high (e.g., the segment size is big) and/or there is insufficient throughput, the playback buffer size may pause increasing or may experience shrinking. When a UE becomes in a steady-state, the playback buffer size may also be relative steady with only minor fluctuations.

Figure 12:
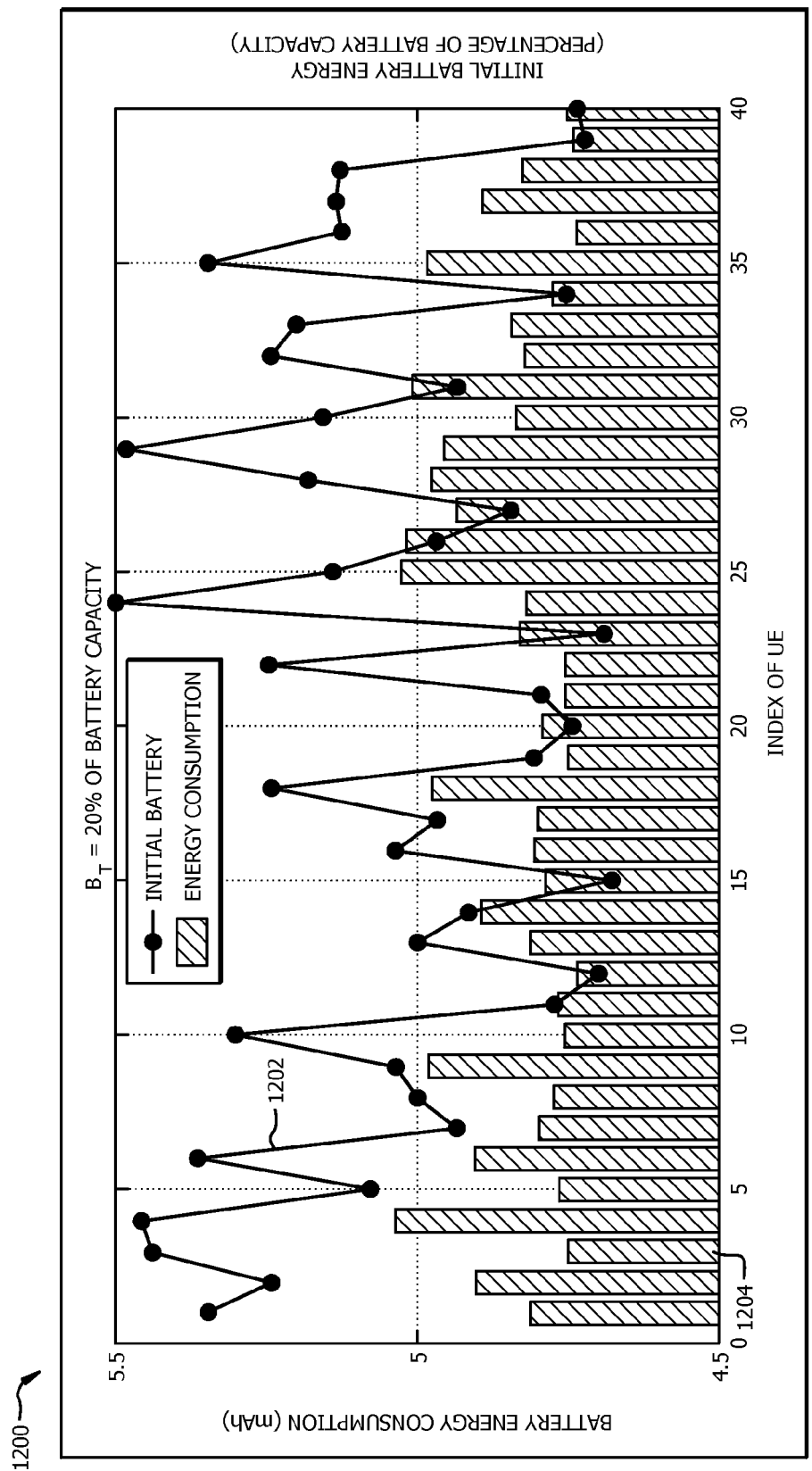
FIG. 12 is an embodiment of a chart of battery consumption for a plurality of UEs.

FIG. 12 is an embodiment of a chart of battery consumption for a plurality of UEs 1200. The initial battery energy of a UE may range from about 15% of capacity to about 100% of capacity (e.g., a fully charged battery) and is indicated by the line graph 1202. A corresponding energy consumption used for each UE is indicated by the bar graph 1204 below the line graph 1202. By using the proposed DASH over MU-MIMO LTE system, a UE with a low initial battery energy may consume less energy than a UE with a higher initial battery energy.

Figure 13:
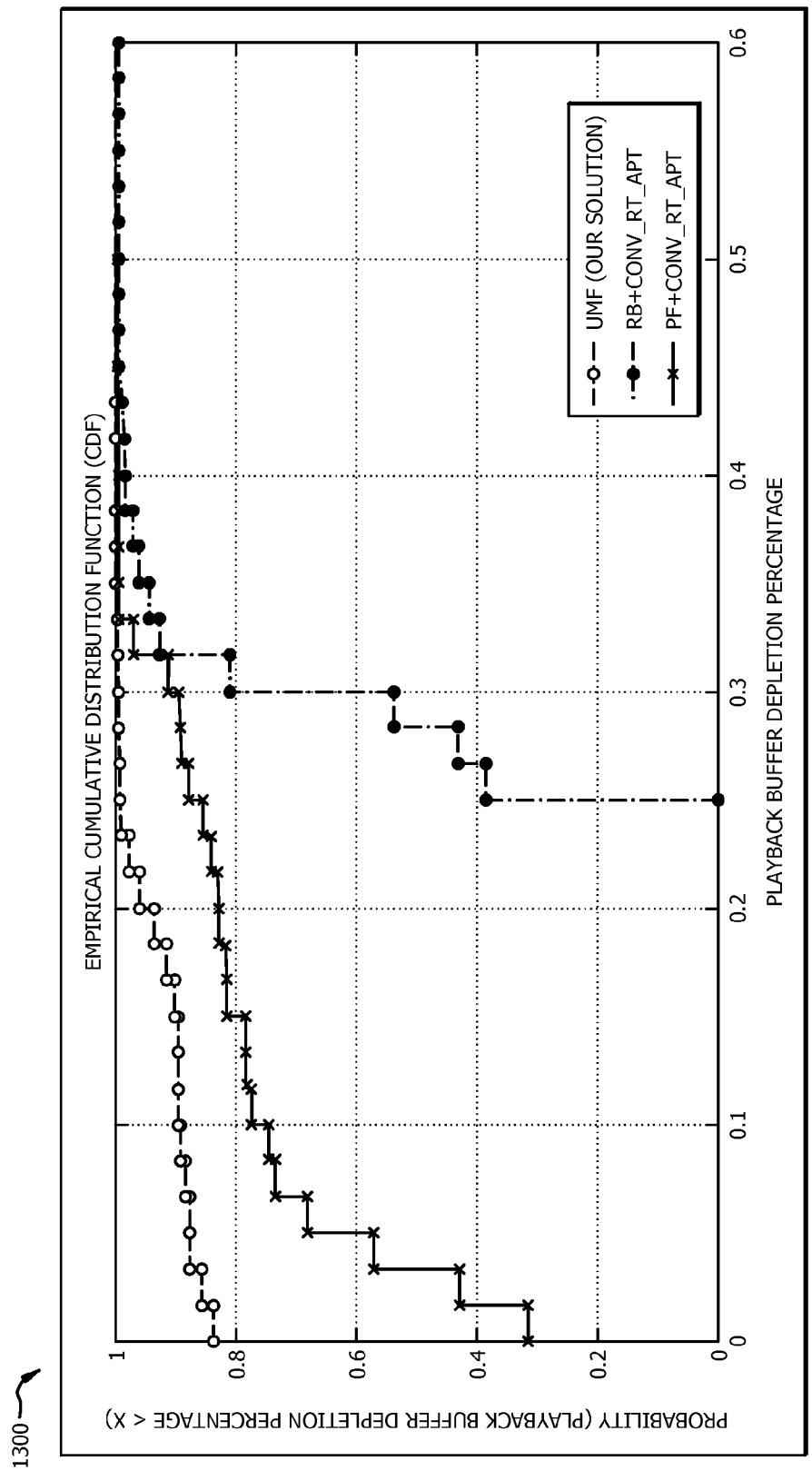
FIG. 13 is an embodiment of a chart of playback buffer depletion percentage for a plurality of UEs.

FIG. 13 is an embodiment of a chart of playback buffer depletion percentage for a plurality of UEs 1300. A UE may be at risk of buffer depletion if the playback buffer size of a UE is lower than the playback buffer threshold. At the end of each TTI, the percentage of the UEs with a risk of buffer depletion may be recorded. FIG. 13 is based on about 30,000 samples (e.g., 30,000 TTIs) with a playback buffer threshold held at a fixed value of about 240 frames (e.g., 10 s of video) and with the initial playback buffer size for the UEs ranging from about 180 frames to about 300 frames. Some UEs may initially begin with a playback buffer size below the playback buffer threshold. Additionally, the initial battery energy may range from about 80% of capacity to 100% of capacity (e.g., a fully charged battery). Using a cumulative density function (CDF) data analysis, the proposed DASH over MU-MIMO LTE system may reduce the occurrences of buffer depletion events compared to other DASH over MU-MIMO LTE systems (e.g., RB+Conv_RT_APT and PF+Conv_RT_APT). RB+Conv_RT_APT may represent a scheme with rate-based opportunistic scheduling and conventional rate-adaptation heuristics, in which a scheduler schedules the non-conflicting UEs with maximum rates on corresponding subbands and the requested bit rate is directly matched to the video throughput. PR+Conv_RT_APT may represent a scheme with proportional fairness scheduling in conjunction with conventional rate adaptation heuristics. Each of the schemes may be considered while in an OFDM MU-MIMO operation mode. For example, when the probability of playback buffer depletion is about 30%, the probability of no UEs with playback buffer depletion for the proposed DASH over MU-MIMO LTE system may be about 100% compared to about 80% for RB+Conv_RT_APT and about 88% for PF+Conv_RT_APT.

Additionally, the probability that the DASH over MU-MIMO LTE system has no UEs in playback buffer depletion may be maintained at about 84% or higher.

Figure 14:
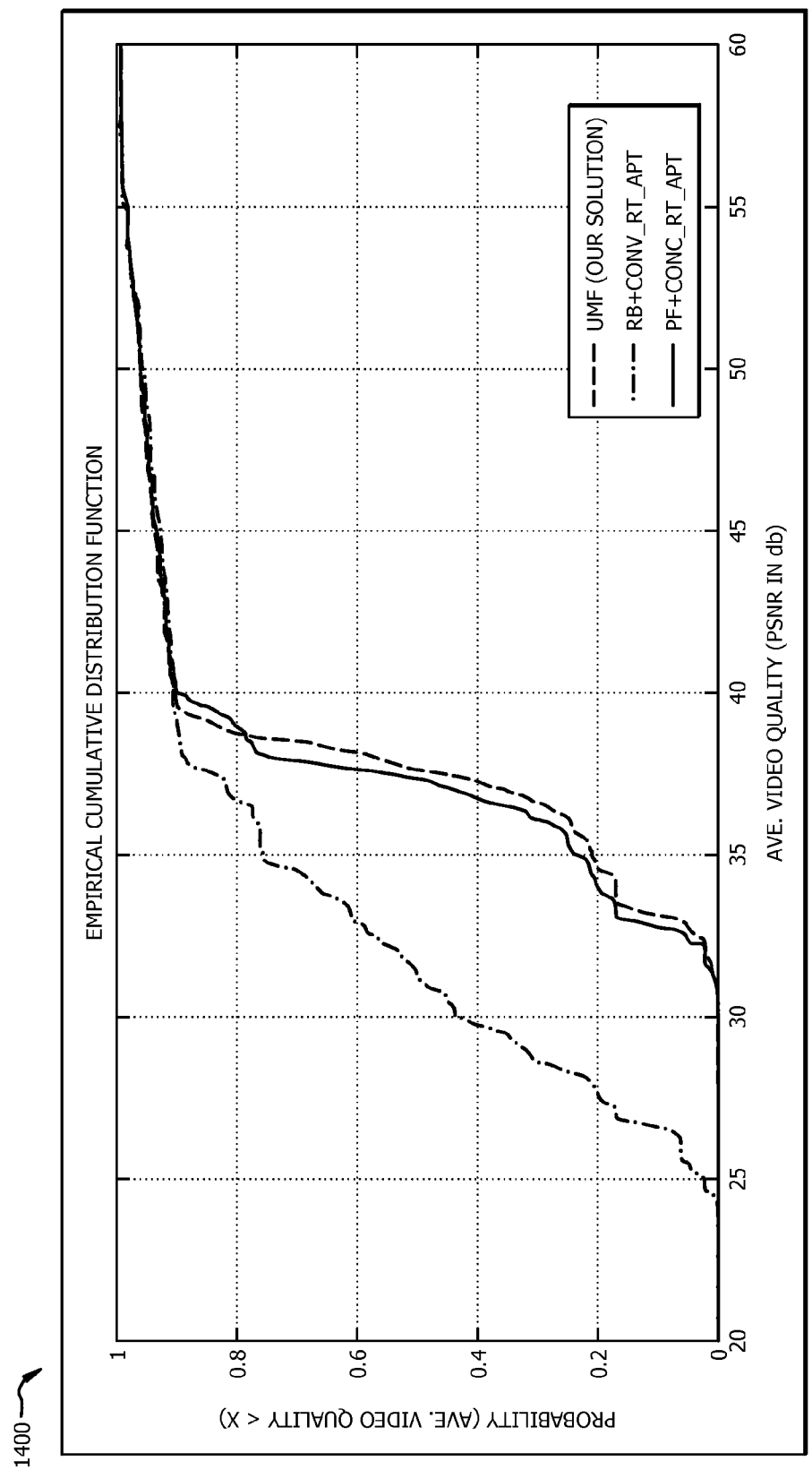
FIG. 14 is an embodiment of a plot of video session quality for a plurality of UEs.

FIG. 14 is an embodiment of a chart of video session quality for a plurality of UEs 1400. At the end of each TTI, PSNR information for the frames played by the UEs may be collected to provide an average video quality across all of the UEs. The PSNR of each frame used during a simulation may be based on a real video trace generated for each representation level. Based on a sample size of about 30,000 samples (e.g., 30,000 TTIs), the performance of the proposed DASH over MU-MIMO LTE system performance may be compared to other DASH over MU-MIMO LTE systems (e.g., RB+Conv_RT_APT and PF+Conv_RT_APT). The DASH over MU-MIMO LTE system provides a better average video quality than other DASH over MU-MIMO LTE systems. For example, for a given PSNR, the corresponding probability is lower for the DASH over MU-MIMO LTE system than other conventional systems.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. A method for scheduling user equipment (UE) devices, the method comprising:

receiving a request for a video service from one or more of the UE devices using a wireless network connection;

establishing a hypertext transfer protocol (HTTP) connection with the UE devices;

implementing a dynamic adaptive video streaming over HTTP (DASH) protocol to send a plurality of media content segments in response to the video service request; and scheduling the UE devices to receive the plurality of media content segments based on a weight of priority associated with each of the UE devices with respect to a plurality of subbands, wherein the scheduling comprises;

sorting the one or more UE devices based on the weight of priority associated with each of the UE devices with respect to the plurality of subbands; and assigning the one or more of the UE devices to each of the subbands using the weight of priority associated with the UE devices, wherein the weight of priority is based on one or more network utility functions associated with the UE devices, wherein the weight of priority is determined from the following $$\lambda_{k,s}(t) = \frac{r_{k,s}(t)}{W} U'_r(\bar{r}_k) - C'_q(q_k(t)) \frac{r_{k,s}(t)D_t}{s_f(t)} + e_k D_t \cdot C'_b(b_k(t)) r_{k,s}(t),$$

wherein $\lambda_{k,s}(t)$ is a weight of priority of UE k on subband s at a t-th time transmission interval (TTI), $r_{k,s}(t)$ is a supportable data rate of UE k on subband s, W is a constant time window, $U'_r(\bar{r}_k)$ is a gradient for a function $U_r$ at UE k in terms of average video rate, $C'_q(q_k(t))$ is a gradient for a function $C_q$ at UE k in terms of playback buffer, $D_t$ is a duration of TTI, $s_f(t)$ is a size of a current video frame in transition, $e_k$ is a power consumption for receiving a unit throughput, and $C'_b(b_k(t))$ is a gradient for a function $C_b$ at UE k in terms of battery energy.

2. The method of claim 1, wherein the one or more network utility functions are functions of an average video rate, a playback buffer size, and a battery energy level associated with one of the UE devices.

3. The method of claim 1, wherein assigning one or more of the UE devices to each of the subbands comprises assigning UE devices having a larger weight of priority before UE devices having a smaller weight of priority.

4. The method of claim 1, further comprising receiving a plurality of precoding matrix indicators (PMIs) and channel quality indicators (CQIs) associated with a plurality of UE devices within the wireless network connection, wherein assigning the one or more UE devices to the subbands comprises selecting UE devices associated with different PMIs within each of the subbands.

5. The method of claim 1, further comprising:
   determining that one or more of the UE devices are assigned to multiple subbands;
   maintaining the assignments of the UE devices with the largest weight of priority for the UE devices assigned to multiple subbands; and
   removing the remaining UE device assignments for the UE devices assigned to multiple subbands that do not have the largest weight of priority for the UE devices assigned to multiple subbands.

6. The method of claim 1, further comprising:
   determining that one or more of the subbands can support one or more UE devices; and
   assigning one or more of the UE devices to each of the subbands that can support one or more UE devices using the weight of priority associated with the UE devices.

7. The method of claim 1, further comprising sorting the subbands according to the weight of priority of the UE devices within the subband.

8. The method of claim 1, wherein the wireless network connection is a multi-user multiple-input-multiple-output (MU-MIMO) long-term evolution (LTE) network.

9. The method of claim 1, wherein one or more of the UE devices assigned to the subbands is configured to adjust a representation quality level in a segment request based on a target requested video rate, a playback buffer size, and a battery energy level of the UE devices.

10. An apparatus comprising:
    a receiver configured to:
      receive a request for a video service from one or more user equipment (UE) devices using a multi-user multiple-input-multiple-output (MU-MIMO) long-term evolution (LTE) network connection; and
    a memory device and a processor coupled to the memory device and the receiver, wherein the memory device comprises computer executable instructions stored on a non-transitory computer readable medium such that when executed by the processor causes the processor to:
      establish a hypertext transfer protocol (HTTP) connection with the UE devices;
      implement a dynamic adaptive video streaming over HTTP (DASH) protocol to send a plurality of media content segments in response to the video service request; and
      schedule the UE devices to receive the plurality of media content segments based on a weight of priority associated with each of the UE devices with respect to a plurality of subbands;
    wherein the weight of priority is derived from a gradient of a function of an average video rate, a playback buffer size, and a battery energy level associated with the UE devices, and wherein the weight of priority is determined from the following $$\lambda_{k,s}(t) = \frac{r_{k,s}(t)}{W} U'_r(\bar{r}_k) - C'_q(q_k(t))\frac{r_{k,s}(t)D_t}{s_f(t)} + e_k D_t \cdot C'_b(b_k(t))r_{k,s}(t),$$

wherein $\lambda_{k,s}(t)$ is a weight of priority of UE k on subband s at a t-th time transmission interval (TTI), $r_{k,s}(t)$ is a supportable data rate of UE k on subband s, W is a constant time window, $U'_r(\bar{r}_k)$ is a gradient for a function $U_r$ at UE k in terms of average video rate, $C'_q(q_k(t))$ is a gradient for a function $C_q$ at UE k in terms of playback buffer, $D_t$ is a duration of TTI, $s_f(t)$ is a size of a current video frame in transition, $e_k$ is a power consumption for receiving a unit throughput, and $C'_b(b_k(t))$ is a gradient for a function $C_b$ at UE k in terms of battery energy;
    a transmitter coupled to the processor, wherein the transmitter is configured to:
      send the plurality of media content segments in response to the video service request.

11. The apparatus of claim 10, wherein the weight of priority is based on one or more utility functions associated with the UEs.

12. The apparatus of claim 10, wherein one or more of the UE devices are configured to adjust a representation quality level in a segment request based on a target requested video rate, the playback buffer size, and the battery energy level of the UE devices.

* * * * *